US008243358B2

(12) United States Patent
Wen et al.

(10) Patent No.: US 8,243,358 B2
(45) Date of Patent: Aug. 14, 2012

(54) CONSTRUCTING PLANAR AND THREE-DIMENSIONAL MICROSTRUCTURES WITH PDMS-BASED CONDUCTING COMPOSITE

(75) Inventors: Weijia Wen, Hong Kong (CN); Ping Sheng, Hong Kong (CN); Xize Niu, Hong Kong (CN); Liyu Liu, Hong Kong (CN)

(73) Assignee: The Hong Kong University of Science & Technology, Hong Kong (CN)

( * ) Notice: Subject to any disclaimer, the term of this patent is extended or adjusted under 35 U.S.C. 154(b) by 283 days.

(21) Appl. No.: 11/905,794

(22) Filed: Oct. 4, 2007

(65) Prior Publication Data

US 2008/0123174 A1 May 29, 2008

Related U.S. Application Data

(60) Provisional application No. 60/860,713, filed on Nov. 24, 2006.

(51) Int. Cl.
*G02F 1/01* (2006.01)

(52) U.S. Cl. ........................................................ 359/288

(58) Field of Classification Search .................. 359/288; 252/521.5, 520.3, 518.1

See application file for complete search history.

(56) References Cited

U.S. PATENT DOCUMENTS 6,017,587 A * 1/2000 Kleyer et al. ................ 427/387
6,323,659 B1 11/2001 Krahn
6,679,471 B2 1/2004 Domeier et al.
6,692,680 B2 2/2004 Lee et al.
7,001,191 B2 2/2006 Nishizawa
7,125,510 B2 10/2006 Huang
2004/0192834 A1 * 9/2004 Nakayoshi et al. ........... 524/588
2008/0198098 A1 * 8/2008 Gelbman et al. ................ 345/59
2008/0277631 A1 * 11/2008 Smela et al. ............... 252/520.3

FOREIGN PATENT DOCUMENTS

GB 2373279 A 9/2002
WO 01/28292 A2 4/2001
WO 2004/003937 A1 1/2004
WO WO 2004/003937 A1 1/2004

(Continued)

OTHER PUBLICATIONS

Niu, Xize; Peng, Suili; Liu, Liyu; Wen, Weija; Sheng, Ping. Characterizing and patterning of PDMS-based conducting composites. Advanced Materials. (2007) vol. 19, 2682-2686.

(Continued)

*Primary Examiner* — Ricky Mack
*Assistant Examiner* — Mahidere Sahle
(74) *Attorney, Agent, or Firm* — Nath, Goldberg & Meyer; Jerald L. Meyer; Stanley N. Protigal

(57) ABSTRACT

We present an invention on the synthesis of elastic, biocompatible functional microstructures wherein the designed electrical functionalities are achieved by mixing conducting nano to micro-particles with PDMS gels. The methodology for constructing planar and three-dimensional microstructures by soft-lithographic technique is presented. Applications such as electrodes, conducting strips, two and three-dimensional microstructures for electrical wiring connections, micro heaters, micro heater arrays, flexible thermochromic displays, and applications for microfluidic devices are demonstrated, all with demonstrated elastic flexibility and fall-proof characteristics while maintaining their functionalities. Results obtained are very promising for the utilization of such composites in future micro-fabrications, especially for the bio-chips and microfluidic devices.

26 Claims, 15 Drawing Sheets

FOREIGN PATENT DOCUMENTS

| | | | |
|---|---|---|---|
| WO | 2006/004282 | A1 | 1/2006 |
| WO | WO 2006/004282 | A1 | 1/2006 |
| WO | WO 2006004282 | A1 * | 1/2006 |

OTHER PUBLICATIONS

Liu, Liyu; Niu, Xize; Wen, Weijia; Sheng, Ping. Electrorheological fluid-activated flexible platform. Applied Physics Letters. (2006) vol. 88, 173505-1-3.
Liu, Liyu; Niu, Xize; Wen, Weijia. Microheaters fabricated from a conducting composite. Applied Physics Letters. (2006) vol. 89, 223521-1-3.
Niu, Xize; Wen, Weijia; Lee, Yi-Kuen. Electrorheological-fluid-based microvalves. Applied Physics Letters. (2005) vol. 87, 243501-1-3.
Liu, Liyu; Wen, Weijia; Sheng, Ping. Paperlike thermochromic display. Applied Physics Letters. (2007) vol. 90. 213508-1-3.
Liu, Liyu; Chen, Xiaoqing; Niu, Xize; Wen, Weijia; Sheng, Ping. Electrorheological fluid-actuated microfluidic pump. Applied Physics Letters. (2006) vol. 89, 083505-1-3.
Niu, Xize; Liu, Liyu; Wen, Weijia; Sheng, Ping. Active microfluidic mixer chip. Applied Physics Letters. (2006) vol. 88, 153508-1-3.
Liu, Liyu; Peng, Suili; Wen, Weijia; Sheng, Ping. Micro thermoindicators and optical-electronic temperature control for microfluidic applications. Applied Physics Letters. (2007) vol. 91, 093513-1-3.
George Maltezos, Matthew Johnston, and Axel Scherer. Thermal management in microfluidics using micro-Peltier junctions. Applied Physics Letters 87, 154105 2005.
Enbang Li, Xiaolin Wang, Chao Zhang. Fiber-optic temperature sensor based on interference of selective higher-order modes. Applied Physics Letters 89, 091119 2006.
Michael G. Roper, Christopher J. Easley, Lindsay A. Legendre, Joseph A. C. Humphrey, and James P. Landers. Infrared Temperature Control System for a Completely Noncontact Polymerase Chain Reaction in Microfluidic Chips. Anal. Chem. 2007, 79, 1294-1300.
Ki-Hun Jeong, Jaeyoun Kim, Luke P. Lee. Biologically Inspired Artificial Compound Eyes. Science 312, 557-561 (2006).
Hideyuki F. Arata, Hiroyuki Noji, Hiroyuki Fujita. Motion control of single F1-ATPase rotary biomolecular motor using microfabricated local heating devices. Applied Physics Letters 88, 083902 (2006).
Francis Tsow, Nongjian Tao. Microfabricated tuning fork temperature and infrared sensor. Applied Physics Letters 90, 174102 (2007).
W H Song and J Lichtenberg. Thermo-pneumatic, single-stroke micropump. J. Micromech. Microeng. 15 (2005) 1425-1432.
Tao Tong, Jinggao Li, Qing Chen, Jon P. Longtin, Szymon Tankiewicz, Sanjay Sampath. Ultrafast laser micromachining of thermal sprayed coatings for microheaters: design, fabrication and characterization. Sensors and Actuators A 114 (2004) 102-111.
M S Jaeger, T Mueller and T Schnelle. Thermometry in dielectrophoresis chips for contact-free cell handling. J. Phys. D: Appl. Phys. 40 (2007) 95-105.
Elena M. Lucchetta, Matthew S. Munson and Rustem F. Ismagilov. Characterization of the local temperature in space and time around a developing *Drosophila* embryo in a microfluidic device. Lab Chip, 2006, 6, 185-190.
Andrew J. deMello. Control and detection of chemical reactions in microfluidic systems. Nature vol. 442 Jul. 27, 2006. 394-402.
Andrew J. deMello. DNA amplification moves on. Nature vol. 422 Mar. 6, 2003. 28-29.
Gwiy-Sang Chung. Fabrication and characterization of micro-heaters with low-power consumption using SOI membrane and trench structures. Sensors and Actuators A 112 (2004) 55-60.
Martin Hennig and Dieter Braun. Convective polymerase chain reaction around micro immersion heater. Applied Physics Letters 87, 183901 (2005).
Keon Jae Lee, Kari A. Fosser, and Ralph G. Nuzzo. Fabrication of Stable Metallic Patterns Embedded in Poly (dimethylsiloxane) and Model Applications in Non-Planar Electronic and Lab-on-a-Chip Device Patterning. Adv. Funct. Mater. 2005, 15, No. 4, April.
Sandro Cesaro-Tadic, Gregor Dernick, David Juncker, Gerrit Buurman, Harald Kropshofer, Bruno Michel, Christof Fattinger, and Emmanuel Delamarche. High-sensitivity miniaturized immunoassays for tumor necrosis factor alpha using microfluidic systems. Lab Chip, 2004, 4, 563-569.
Andrew J. Gawron, R. Scott Martin, Susan M. Lunte. Fabrication and evaluation of a carbon-based dual-electrode detector for poly(dimethylsiloxane) electrophoresis chips. Electrophoresis 2001, 22, 242-248.
Zhizhong Yin and Andrea Prosperetti. 'Blinking bubble' micropump with microfabricated heaters. J. Micromech. Microeng. 15 (2005) 1683-1691.
A.W. Jackson, A.C. Gossard. Thermal imaging of wafer temperature in MBE using a digital camera. Journal of Crystal Growth 301-302 (2007) 105-108.
Lionel Aigouy, Gilles Tessier, Michel Mortier, Benoît Charlot. Scanning thermal imaging of microelectronic circuits with a fluorescent nanoprobe. Applied Physics Letters 87, 184105 (2005).
Soyoun Jung, Taeksoo Ji, and Vijay K. Varadan. Temperature sensor using thermal transport properties in the subthreshold regime of an organic thin film transistor. Applied Physics Letters 90, 062105 (2007).
Kwan Seop Lim, Woo-Jin Chang, Yoon-Mo Koo, and Rashid Bashir. Reliable fabrication method of transferable micron scale metal pattern for poly(dimethylsiloxane) metallization. Lab Chip, 2006, 6, 578-580.
Liu, Liyu; Peng, Suili; Niu, Xize; Wen, Weijia. Microheaters fabricated from a conducting composite. Applied Physics Letters. (2006) vol. 89, 223521-1-3.
Liu, Liyu; Peng, Suili; Wen, Weijia; Sheng, Ping. Paperlike thermochromic display. Applied Physics Letters. (2007) vol. 90. 213508-1-3.
Chinese Office Action, mailed on Mar. 4, 2011.

* cited by examiner

CONSTRUCTING PLANAR AND THREE-DIMENSIONAL MICROSTRUCTURES WITH PDMS-BASED CONDUCTING COMPOSITE

This application claims the benefit of U.S. Provisional Application No. 60/860,713 filed Nov. 24, 2006. The aforementioned provisional application's disclosure is incorporated herein by reference in its entirety.

FIELD OF THE SUBJECT MATTER

This subject matter relates to the synthesis of elastic, biocompatible functional microstructures wherein the designed electrical functionalities are achieved by mixing conducting nano to micro-particles with PDMS gels, in which the critical volume fraction of solid particles is chosen to ensure good conductivity, reliable mechanical properties, as well as desirable thermal characteristics. By using such composites, a methodology for constructing planar and three-dimensional microstructures by soft-lithographic technique has been developed. Applications such as electrodes, conducting strips, two and three-dimensional microstructures for electrical wiring connections, micro heaters, micro heater arrays, flexible thermochromic displays, and applications for microfluidic devices are demonstrated, all with demonstrated elastic flexibility and fall-proof characteristics while maintaining their functionalities. Results obtained are very promising for the utilization of such composites in micro-fabrications, especially for bio-chips.

BACKGROUND OF THE SUBJECT MATTER

In recent years, there has been considerable progress on fabricating microfluidic devices with multiple functionalities, with the goal of attaining lab-on-a-chip [1-3] integration. These efforts have benefited from the development of micro-fabrication technologies such as soft lithography [4]. Polydimethylsiloxane (PDMS) has played an important role for building micro-structures owing to its properties such as transparency, bio-compatibility, and good flexibility [5]. Some complicated micro-devices can be realized by using simple manufacturing techniques such as micro molding with PDMS materials (U.S. Pat. Nos. 7,125,510; 6,692,680; and 6,679,471). However, PDMS is a nonconducting polymer, and patterning metallic structures is very difficult due to the weak adhesion between metal and PDMS. Hence the integration of conducting structures into PDMS has been a critical issue, especially for those applications such as electrokinetic micro-pumps, micro sensors, micro heaters, ER actuators etc. [6-7] that require electrodes for control and signal detection.

Gawron et al. [8] first reported the embedding of thin carbon fibers into PDMS-based microchips for capillary electrophoresis detection. Lee et al. [9] reported the transfer and subsequent embedding of thin films of gold patterns into PDMS via adhesion chemistries mediated by a silane coupling agent. Lim et al. [10] developed a method of transferring and stacking metal layers onto a PDMS substrate by using serial and selective etching techniques. As shown in the U.S. Pat. No. 6,323,659, the electrodes comprising a base material and filler material was disclosed to be used to determine the presence of water in a material. Where a conductive electrode may be formed by depositing carbon black on the elastomer surface, that is accomplished either by wiping on the dry powder or by exposing the elastomer to a suspension of carbon black in a solvent. Alternatively, the electrode may be formed by constructing the entire layer out of an elastomer doped with conductive material (i.e. carbon black or finely divided metal particles). However, incompatibility between PDMS and metal usually causes failures in the fabrication process, especially in the bonding of two materials. Therefore, selection of a right composite with good conductivity, reliable mechanical property, as well as desired thermal characteristics for constructing micro-devices is of great urgency. In particular, the construction of the micro-devices with three-dimensional conducting structures, such as three-dimensional wiring and packaging, represents challenges for the micro-fabrication processing. PDMS-based conducting composites may be promising materials for micro-device fabrication.

BRIEF SUMMARY OF THE INVENTION

The present invention relates generally to micro fabrication techniques and PDMS composite materials. More particularly, the present invention relates to the synthesis of elastic, bio-compatible functional microstructures wherein the designed electrical functionalities are achieved by mixing conducting nano-to-micro particles with PDMS gels, in which the critical volume fraction of solid particles is chosen to ensure good conductivity, reliable mechanical properties, and desirable thermal characteristics. By using such composites, improved methodologies have been developed for constructing planar and three-dimensional microstructures by soft-lithographic techniques. The composites of the inventive subject matter may be used to fabricate a variety of useful microstructures. For example specific embodiments of the present subject matter may include electrodes, conducting strips, two and three-dimensional microstructures for electrical wiring connections, micro heaters, micro heater arrays, flexible thermochromic displays, and applications for microfluidic devices. Furthermore, structures made with the inventive composites and/or methods further demonstrate elastic flexibility and fall-proof characteristics while maintaining their functionalities.

One embodiment of the present subject matter relates to a fabricated planar structure, three-dimensional structure, or combinations thereof, comprising at least one PDMS-based conducting composite, wherein the structure provides predesigned electrical conductivity and mechanical characteristics. A further embodiment of the present subject matter relates to a fabricated planar structure, three-dimensional structure, or combination thereof, wherein the at least one PDMS-based conducting composite comprises (a) Ag+PDMS; (b) Carbon black (C)+PDMS; or (c) combinations thereof. In one embodiment of the present subject matter, the at least one PDMS-based conducting composite comprises Ag+PDMS at a Ag wt/PDMS wt concentration ranging from about 83% to about 90% by weight. In a more preferred embodiment, the Ag wt/PDMS wt concentration ranges from about 84% to about 87% by weight. Another embodiment of the present subject matter relates to the fabricated planar structure, three-dimensional structure, or combination thereof, wherein the at least one PDMS-based conducting composite comprises C+PDMS at a carbon black wt/PDMS wt concentration ranging from about 10% to about 30% by weight. In a more preferred embodiment, the carbon black wt/PDMS wt concentration ranges from about 15% to 27%. In yet another embodiment of the present subject matter, the Ag+PDMS composite comprises Ag particles ranging in average size from about 1.0 μm to about 2.2 μm. In another embodiment, the C+PDMS composite comprises carbon black particles ranging in average size from about 30 nm to 100 nm.

Another embodiment of the present subject matter relates to the fabricated planar structure, three-dimensional structure, or combination thereof, wherein the fabricated structure is a rod array, a multilayer wiring co-junction, or a cross bridge, comprising the predesigned electrical conductivity and mechanical characteristics. In one embodiment of the present subject matter, the fabricated structure or predesigned pattern is fabricated using soft-lithographic techniques. In another embodiment of the present subject matter, the fabricated structure is embedded in PDMS bulk material by molding into designed shapes and patterns. In yet another embodiment of the present subject matter, the fabricated structure comprises at least one conducting wiring structure having a minimum size of 10 microns. In a preferred embodiment of the present subject matter, the fabricated structure is mechanically elastic and flexible while maintaining the designed electrical conductivity. In another preferred embodiment of the present subject matter, the fabricated structure is fall-proof.

One embodiment of the present subject matter relates to using the inventive fabricated composites for use as a micro-heater, or device comprising a micro-heater. In a particular embodiment of the present subject matter, the micro-heater, or device comprising a micro-heater, comprises a heater strip that is at least 25 microns wide or long. In another embodiment of the present subject matter, the maximum local temperature generated by the heater strip can range from ambient temperature to 250° C. In a further embodiment of the present subject matter, the micro-heater, or device comprising a micro-heater, having (a) an overall structure that is mechanically elastic and flexible while maintaining local heating functionalities; (b) an overall structure that is fall-proof; or (c) combinations thereof.

Another embodiment of the present subject matter relates to using the inventive fabricated composites for use as a thermal array. In a particular embodiment of the present subject matter, the thermal array comprises a temperature sensing mechanism that may optionally control conductivity in the heater strip. In a further embodiment of the present subject matter, the thermal array further comprises a temperature sensing mechanism comprising at least one thermochromic microcolor bar whose color can be sensed optically. In a still further embodiment of the present subject matter, the thermal array comprises a temperature sensing mechanism comprising at least one thermochromic microcolor bar whose color can be sensed optically, and wherein detection of color from the at least one thermochromic microcolor bar is monitored optically and subsequent conductivity through the heating strip is controlled through an electro-optic feedback system that stops heating when the desired thermochromic microcolor bar is activated by the desired threshold temperature.

An additional embodiment of the present subject matter relates to using the inventive fabricated composites for use as a thermally activated display. In one embodiment of the present subject matter, the thermally activated display comprises (a) a thermochromic composite and (b) a Ag+PDMS composite; and wherein the fabricated structure is thermochromic, electrical conducting, and flexible. In another embodiment of the present subject matter, the thermally activated display comprises (a) a thermochromic composite layer contacting (b) a Ag+PDMS composite layer. In a further embodiment of the present subject matter, the thermally activated display comprises the fabricated Ag+PDMS structure embedded with a conductive wire pattern corresponding to a predesigned pattern for display.

A further embodiment of the present subject matter relates to using the inventive fabricated composites for use as a thermally activated display embedded with a multiplicity of independent conductive wire patterns localized in a matrix-like array of independent pixels; wherein each pixel may independently display a color the same or different from a neighboring pixel based upon the degree of heating supplied by the conductive wiring to each individual pixel. In one embodiment of the present subject matter, the thermally activated display comprises (a) a thermochromic composite layer contacting (b) a Ag+PDMS composite layer; wherein the conductive wire patterns are embedded in the Ag+PDMS layer. In another embodiment of the present subject matter, the thermally activated display comprises Ag+PDMS at a Ag wt/PDMS wt concentration ranging from about 84% to about 88% by weight. In yet another embodiment of the present subject matter, the thermally activated display comprises microencapsulated thermochromic powder as the thermochromic composite.

Another embodiment of the present subject matter relates to using the inventive fabricated composites in a process for making a thermally activated display comprising: (a) mixing microencapsulated thermochromic powder with PDMS at a particle concentration of 20% (w/w); (b) mixing silver powder with PDMS at a Ag wt/PDMS wt concentration ranging from about 84% to about 88% by weight to form a gel-like mixture; (c) embedding at least one conductive wire pattern in the Ag+PDMS mixture; (d) applying a layer of (a) to the gel-like mixture of Ag+PDMS; and (e) curing the layered composites.

DETAILED DESCRIPTION OF THE SUBJECT MATTER

Figure 1:
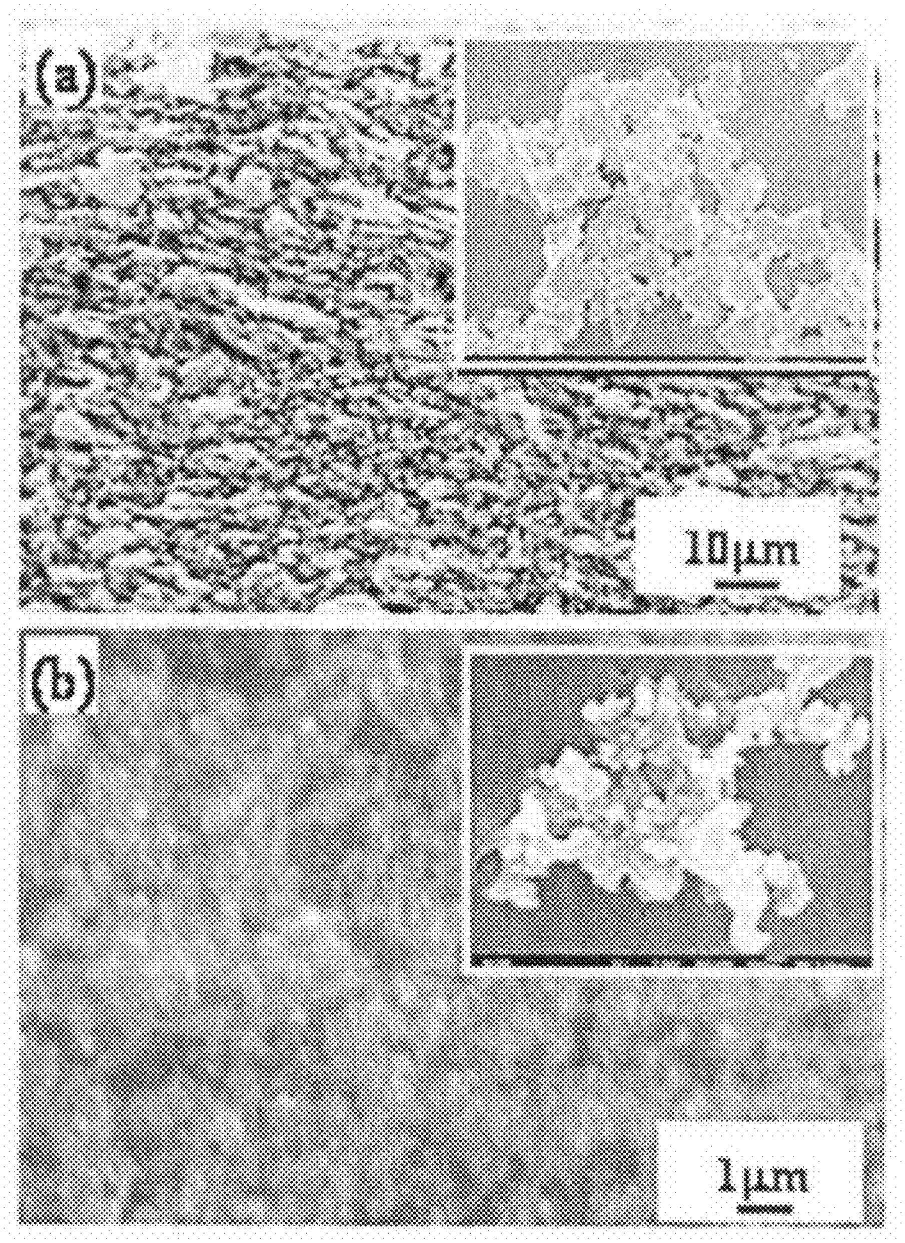
FIG. 1. SEM pictures of the cured conductive composite and powders: (a) Ag+PDMS (84 wt %); (b) C+PDMS 28 wt %.

The inventive subject matter relates to the synthesis of elastic, bio-compatible functional microstructures wherein the designed electrical functionalities are achieved by mixing conducting nano-to-micro-sized particles with PDMS gels, in which the critical volume fraction of solid particles is chosen to ensure good conductivity, reliable mechanical properties, as well as desirable thermal characteristics. By using such composites, a methodology for constructing planar and three-dimensional microstructures by soft-lithographic technique has been developed. Applications such as electrodes, conducting strips, two and three-dimensional microstructures for electrical wiring connections, micro heaters, micro heater arrays, flexible thermochromic displays, and applications for microfluidic devices are demonstrated, all with demonstrated elastic flexibility and fall-proof characteristics while maintaining their functionalities. Results obtained are very promising for the utilization of such composites in micro-fabrications, especially for bio-chips.

As used herein, the phrase "PDMS-based conducting composite" means a composite chemical structure comprising at least one conducting particle component that imparts electrical conductivity to all or a portion of the entire structure. The phrase "conducting particle component" refers to a nano-sized or micro-sized particle component that is electrically conductive. In some embodiments, this particle component is selected from silver powder or carbon black. Other electrically conductive particle components known to one of ordinary skill in the art may also be used to prepare PDMS-based conducting composites.

As used herein, the phrase "mechanically elastic and flexible" refers to the ability of PDMS-based conducting composites to bend under light to moderate mechanical stress without causing substantial permanent deformation of the structure or without disrupting electrical conductivity of the structure. Light to moderate mechanical stress includes wrapping or applying a thin layered structure over a curved or irregular surface, or bending a structure with the fingers to conform to a frame or holder.

As used herein, the term "fall-proof" refers to the ability of PDMS-based conducting composites, and structures substantially made from PDMS-based conducting composites, to resist breakage or fracture of the structure and its conducting properties as a result of mechanical stress caused by a sudden collision, such as, for example, being knocked off a support or falling on a hard surface.

As used herein, the phrase "thermochromic color bar" refers to a device or composition comprising a thermochromic chemical composition in at least one localized area that changes color in response to temperature. Generally, the temperature-changing color can be sensed optically. For example, the color may be sensed by a photodetector, such as the human eye, photographic film, a CCD camera, etc. A thermochromic color bar may include a single localized thermochromic chemical composition that changes colors across a broad color spectrum in response to temperature. Alternatively, a thermochromic color bar may include two or more localized thermochromic chemical compositions, wherein each localized thermochromic chemical composition changes colors in response to a narrow range of temperatures, and wherein a series of such localized compositions may be arranged to sense changes across a broader range of temperatures.

Synthesis of PDMS-based conducting composites: The inventive subject matter relates to composites formed from the mixing of conducting nano-to-micro-sized particles with PDMS gels, wherein a critical volume fraction of solid particles is chosen to ensure good conductivity, reliable mechanical properties, as well as desirable thermal characteristics. In one embodiment, the conducting composites comprise conducting nano-to-micro-sized particles selected from particles of silver (Ag) or carbon black (C), wherein these particles are mixed with PDMS to form the conductive composites Ag+PDMS and C+PDMS that are appropriate for the micro-fabrications. The synthesis process comprises mixing either silver or carbon black with PDMS gels at designed concentrations. In one embodiment of the present subject matter, the Ag wt/PDMS wt concentration ranges from about 83% Ag to about 90% Ag by weight. In a further embodiment, the Ag wt/PDMS wt concentration ranges from about 84% Ag to 87% Ag by weight. In another embodiment, the carbon black (C) wt/PDMS wt concentration ranges from about 10% C to about 30% C by weight. In a further embodiment, the C wt/PDMS wt concentration ranges from about 15% C to 27% C by weight. In yet another embodiment, the silver or carbon black particle sizes range from about 1-2 μm for silver and range from about 30 to 100 nanometers for carbon black, respectively, as can be seen in the insets of FIGS. 1 (*a*) and 1 (*b*). In a preferred embodiment, the carbon black particles range from about 20 nm to 30 nm in diameter. The cross-sectional SEM images taken with cured composites are shown in FIG. 1, wherein the solid particles are seen to be in contact with each other and uniformly distributed in PDMS. The silver and carbon black particles were easy to mix with the PDMS gel, perhaps owing to their desirable wetting characteristics.

Figure 2:
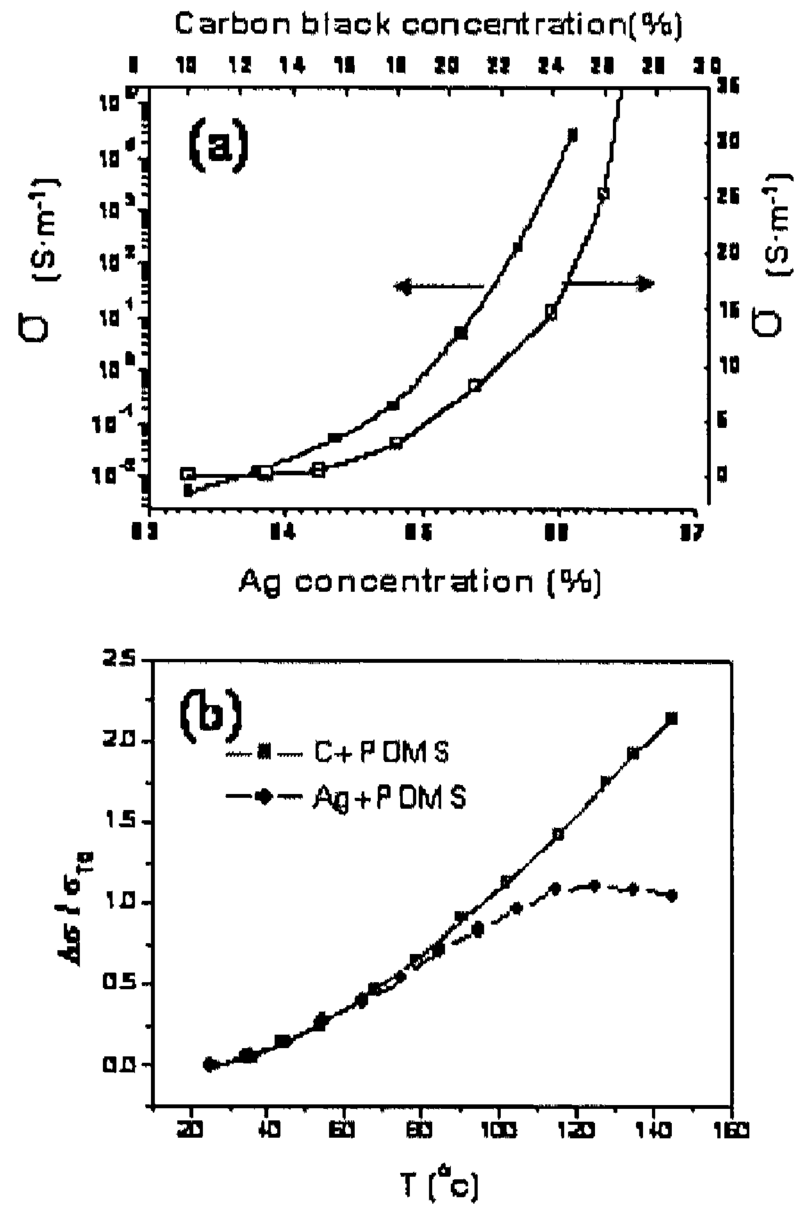
FIG. 2. (a) Conductivity versus powder weight concentration. (b) Variation of conductivity with temperature.

Characterizing PDMS-based conducting composites: The conductivities of two examples of composites are shown in FIG. 2(*a*), plotted as a function of conducting particles concentration. The threshold concentration for the onset of good conductivity in Ag+PDMS composites is about 83 wt % Ag. The conductivity $\sigma$ is seen to increase rapidly beyond the threshold. Similar behavior can be observed for the case of C+PDMS composites but with a much smaller threshold concentration value (~10 wt % C), and the conductivity is also much lower (in some instances, five orders of magnitude smaller than that of the Ag+PDMS composites). The latter is actually desirable for fabricating micro heaters, for example, but unsuitable for those applications where good electrical conduction is required. It should be pointed out here that when the concentration of solid conducting phase is too high, the composite becomes difficult to process as the mechanical characteristics no longer resemble those of PDMS. Therefore, optimal concentration is very critical for PDMS-based conducting composites.

The resistivities of well-cured composites exhibit variations with temperature T, as shown in FIG. 2(*b*). In the temperature range of 25° C. to 150° C., it is seen that the resistivity of C+PDMS increases with increasing temperature, while for Ag+PDMS the resistivity exhibits a peak at about 120° C. and decreases above that temperature. Since these characteristics are reliably repeatable, the temperature variation of the resistivities provides the possibility to design and fabricate thermal sensors by employing PDMS-based conducting composites and their unique thermal characteristics.

Figure 3:
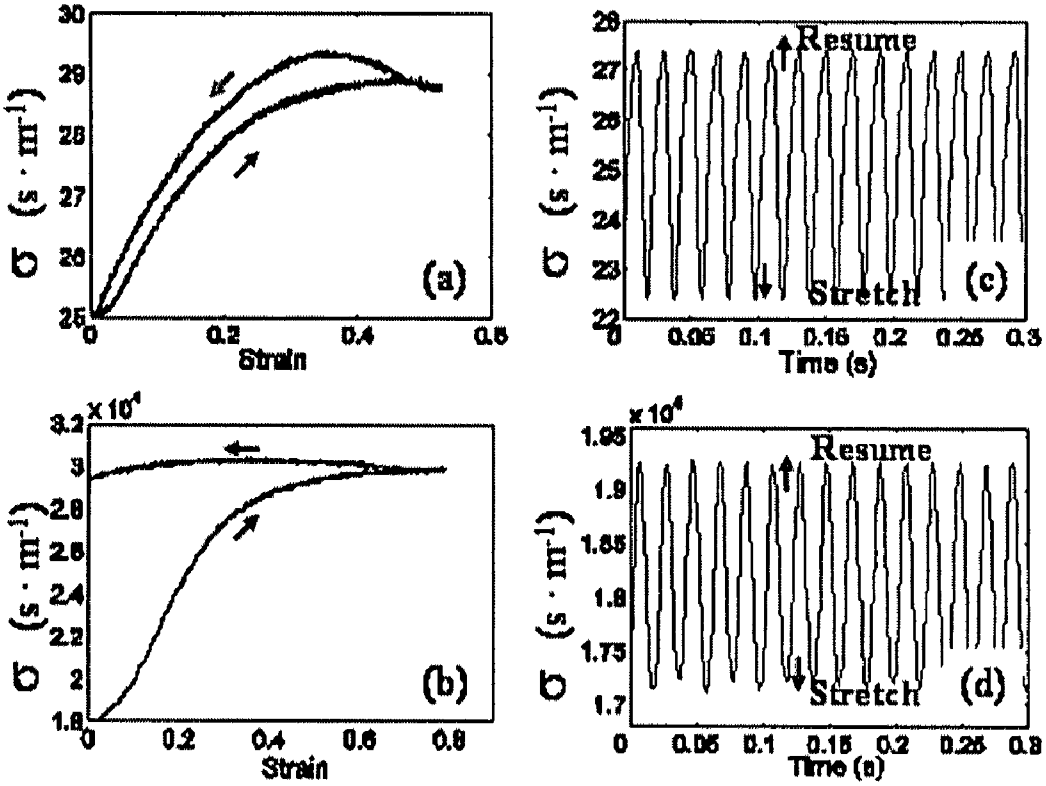
FIG. 3. Conductivity variation under stretching of a 26 wt % C+PDMS strip, 25×2×1 $mm^3$, and a 86 wt % Ag+PDMS strip, 25×1×1 $mm^3$. (a) and (b), quasi-static stretching and restoring in a rate of 1.5 mm/minute for C+PDMS and Ag+PDMS. (c) Dynamic stretching characteristics of the C+PDMS sample, peak-to-peak amplitude 1 mm, 50 Hz. (d) Dynamic stretching characteristics of the Ag+PDMS sample, peak-to-peak amplitude 0.5 mm, 50 Hz.

The mechanical reliability of PDMS-based conducting composites under deformation processing was examined. In one example, to measure the mechanical reliability of the two composites under deformation processing, two 25×2×1 $mm^3$ strips of C+PDMS (26 wt % carbon) and Ag+PDMS (86 wt % Ag) were prepared for the experiment in a pulling system (MTS, Alliance RT/5). By stretching and restoring the sample with a constant speed of 1.5 mm/min, the variation of conductivity under strain was monitored. The results are shown in FIGS. 3(*a*) and 3(*b*) for two samples. It is noted that the conductivities for both samples increased monotonically with increasing strain. The reason for this conductivity variation of the sample with strain can be attributed to the change in the conducting particles contact, i.e., the nano carbon-black particles or silver micro particles have better chance to contact each other when the samples are stretched, and vice versa. When the strain is released, the conductivity restores to the original value with only a small variation for the C+PDMS sample. However, the relaxation characteristic for the Ag+PDMS is very slow comparing to that of C+PDMS sample. It was shown that the former would take more than an hour to restore its original state. The dynamic characteristics of the sample were also determined, by varying the pull-restore cycle frequency. This was carried out by mounting one end of the sample to a static platform and fixing the other to a mechanical vibrator arm. The peak to peak amplitude shown in FIG. 3(*c*) is ~1 mm when the vibration frequency is 50 Hz. It is noted that the waveform as seen in FIG. 3 (*c*) remains discernable even at 200 Hz, implying that such composite can potentially be used as pressure sensors in detecting the dynamic variation of pressure in micro chambers or channels, e.g., by using thin PDMS membranes with imbedded conductive lines one can easily detect small pressure changes. Similar dynamic mechanical property for the Ag+PDMS sample is shown in FIG. 3(*d*).

Figure 4:
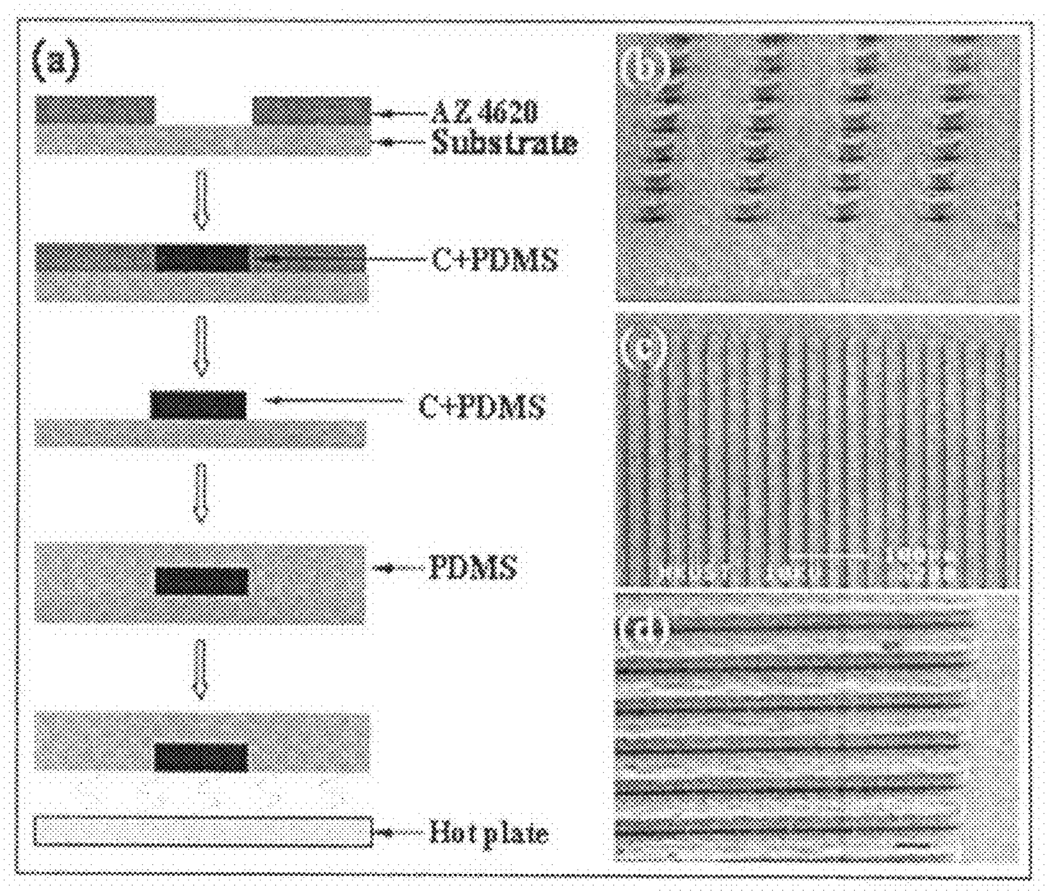
FIG. 4. Process flow chart illustrating the patterning of conductive PDMS by soft lithography. (a) Micro-patterning of the conductive PDMS, (b)-(d) SEM pictures showing the various fabricated conductive patterns.

Fabrication of Planar micro-structures: One example of a procedure to embed one layer of conductive composite into PDMS elastomer is schematically illustrated in FIG. 4(*a*). A thick layer of photoresist, e.g., for example, AZ 4620, is patterned on a glass substrate using a standard photolithographic technique. This is for the purpose of forming a mold to pattern the conductive composite. A variety of other photoresists and/or lithographic techniques may also be employed that are known to one of ordinary skill in the art. After baking, the mold is treated with a demolding reagent, such as, for example, tridecafluoro-1,2,2,2-tetrahydrooctyl-1-trichlorosilane. A variety of other demolding reagents or techniques may also be employed that are known to one of ordinary skill in the art. The conducting composite is synthesized by mixing PDMS (for example, Dow Corning 184) and carbon black powder (for example, Vulcan XC72-R, Cabot Inc., USA) or silver platelets (for example, 1.2~2.2 μm, Unist Business Corp. (Shanghai)) in different concentrations to form C+PDMS or Ag+PDMS gels. A variety of other PDMS compositions and conducting particles may also be employed that are known to one of ordinary skill in the art. The gels are then plastered on the mold. Unnecessary portions of the gel are preferably removed from the mold surface (e.g., by using a blade) to ensure that only a clean pattern is left in the mold. The gel is then cured into a solid, for example, by baking. After baking, for example, for 1 hour at 60° C., the gel is cured into a solid. The photoresist is then removed from the mold substrate. For example, the photoresist AZ 4620 may be removed by dipping the whole mold substrate into a solvent, e.g. acetone and then ethanol, and subsequently washed with DI water. After baking, only PDMS-based conducting composite should be left on the substrate, as exemplified in step 3 of FIG. 4(*a*). The integration or embedding of such conducting micro-patterns into PDMS bulk layer can be realized by pouring pure PDMS gel on a substrate wherein the desired microstructure is immersed in PDMS. After spinning to ensure uniformity of the layer, a PDMS sheet with embedded conducting microstructures can be easily peeled off from the substrate (for example, step 4 in FIG. 4(*a*)). The bonding between the fabricated microstructures and bulk PDMS excellent using this process. No de-bonding or cracking was found for the fabricated samples after annealing by heating, for example, at 150° C. (see last step 5 in FIG. 4(*a*)).

SEM images of examples of different patterns fabricated with Ag+PDMS composites are shown in FIG. 4(*b*). In these examples, the dimensions of the patterns can range from ten microns to hundreds of microns, indicating the capability of the process to micro-fabricate conducting devices of different sizes and having designed variations in micro-dimensional details.

Figure 5:
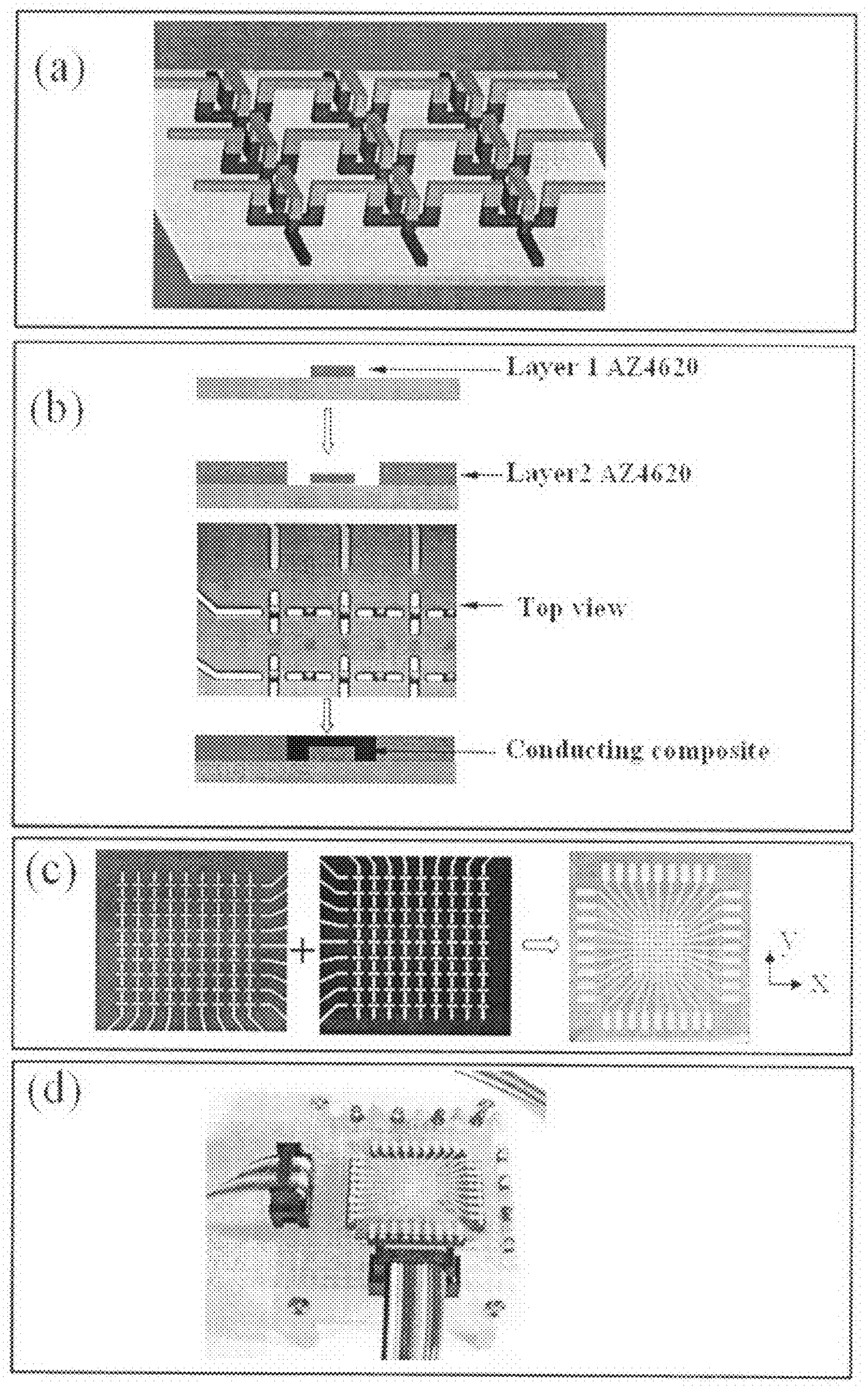
FIG. 5. Patterning and bonding of multilayers and 3-D conductive PDMS. (a) Schematic view of the designed three dimensional conductive lines. (b) Process flow of the micro fabrication. (c) Reverse bonding of two halves into one plate with jumped lines. (d) Testing circuit with LEDs to show the functionality of the bonded plate

Three-dimensional wiring: Three dimensional connections of electrical signals is an important issue in integrated micro chips, e.g., transfer of electrical signals among different layers, communication between inner and outer layered components in multilayered chips. Structures comprising the PDMS-based conducting composites of the inventive subject matter may also be fabricated with integrated electrical circuitry and/or structures that allow connections of electrical signals. For example, for the microstructure depicted in FIG. 5(*a*), the fabrication process can be described by a two-mask process as shown in FIG. 5 (*b*), in which a thin layer (for example, 8 microns in thickness) of photoresist is first patterned with the first mask. After being developed, the remaining photoresist structure is baked, for example, at 150° C. for 30 minutes, to inactivate the photoresist in the next developing process. Then a thicker layer of photoresist (for example, 20 μm in the example) is coated and patterned to generate an 'n' shaped cavity on the mold substrate. Ag+PDMS or C+PDMS mixture is then poured into the cavity. After dissolving the two layers of PR, for example, with acetone for about 30 minutes, and then rinsing, for example, with ethanol and DI water, silane was evaporated onto the sample. Pure PDMS mixture was then poured on the mold and the sample was placed in vacuum, for example, for 20 minutes, to ensure that all cavities are filled with PDMS. After curing, the PDMS sheet with conducting patterns can be peeled off from the substrate and the pattern is depicted in the last panel of FIG. 5(*b*). With $O_2$ plasma treatment, the two halves shown in FIG. 5(*c*) are aligned face to face to bond together under a microscope. The resulting three-dimensional microstructure can be seen in the last right panel of FIG. 5(*c*). For such a structure, electrical signals can be transferred along x or y directions independently without crosstalk. FIG. 5 (*d*) is an example of a schematic testing approach for the sample indicated above. The experiment tests the functionalities of circuit connection with different electronic components as shown in FIG. 5(*d*). One LED was connected to each line and light emitting from these LEDs was separately controlled by a Labview© program. Since Ag+PDMS composite is elastic with good flexibility, the inserted metal pins can be tightly connected to the patches of conducting composite and, therefore, the electric connection is very stable. The testing results indicate that such three-dimensional micro-structural wiring can be used for compact connections for electronic parts located on different layers. As the overall structure is elastically flexible, all of the structure's electrical functionalities are unaffected by falls, e.g., falling from a table accidentally or otherwise.

Figure 6:
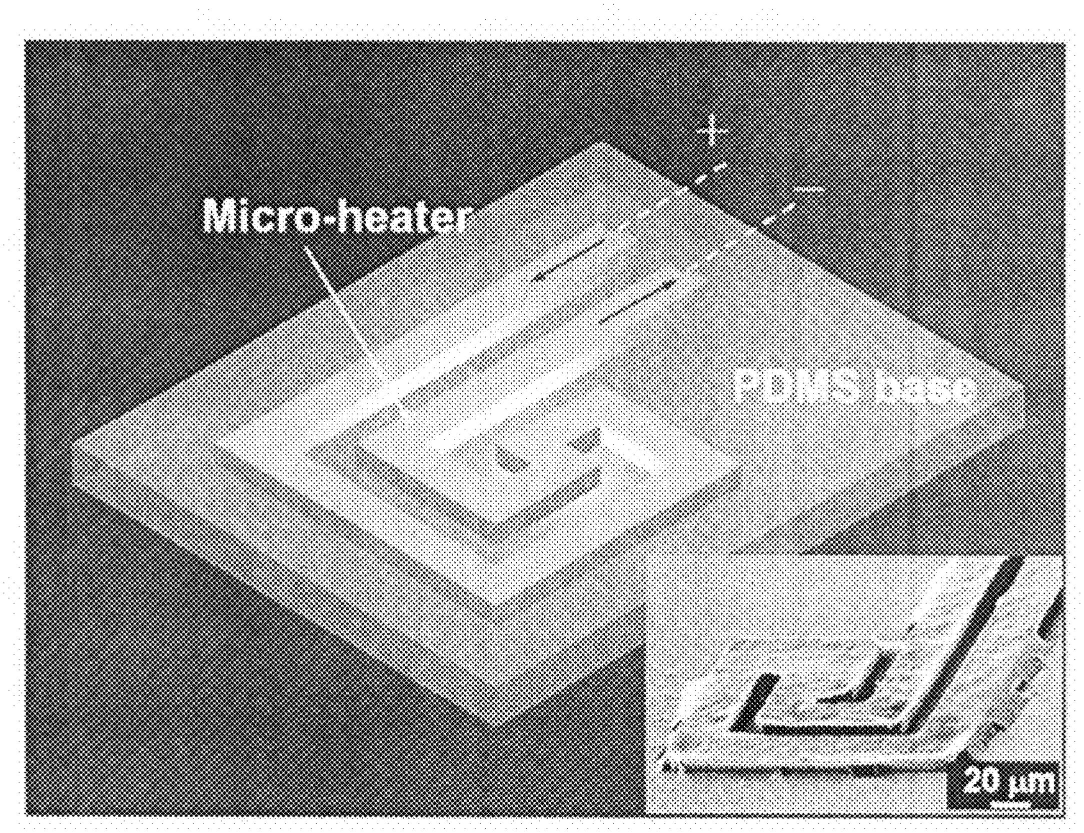
FIG. 6: Schematic illustration of a representative micro-heater. The three-dimensional helical-patterned structure is made from silver micro-particles-PDMS composite. Inset: a SEM picture of the micro-heater whose line width is 25 μm.

Fabrication and characterization of the micro-heaters: PDMS-based conducting composites may also be used to fabricate a micro-heater. An example of using a PDMS-based conducting composite is shown in FIG. 6, where a cartoon and a SEM picture (inset) of a micro-heater are demonstrated. A helical-patterned micro-heater is sealed and supported by a PDMS base and protrudes from the surface upward. Since the composite material is conductive, when the two outstretched wires are connected to positive and negative voltages, electrical current and hence heat will be generated. In the examples, various molds with widths ranging from 25 μm to 100 μm were used to make the conducting strips. The height of all the heater strips in the examples was 14.4 μm, although other heights may be employed. From the inset of FIG. 6, one can see that the width of the heater strip in the example is ~25 μm (in order to take the SEM image, the micro-heater was not sealed with PDMS layer) and the dimension of the micro-heater in the example was about 200×200 $\mu m^2$. In addition, since the composite and base materials (PDMS) are rubber-like with good flexibility, test results show the micro-heater to be operational even when the whole chip was mildly bent.

Figure 7:
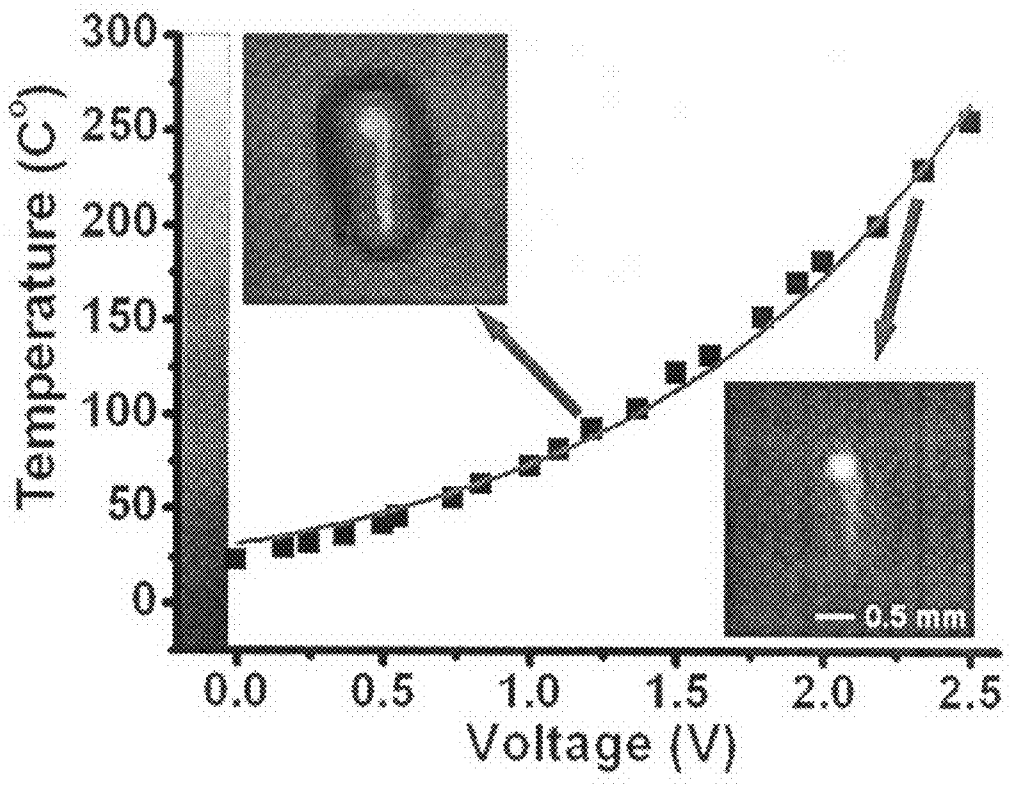
FIG. 7: Temperature of the micro-heater's central heating part plotted as a function of the input voltage. The two insets are IR pictures showing the thermal distributions at specific applied voltages. The bright spot on the right panel is a high temperature region with a temperature of ~250° C.

To verify the heating capability of the micro-heaters in the examples, an infrared (IR) camera (FLIR Systems trademark, model Prism DS) was employed to detect both the heat images and the local temperatures. The IR camera was placed right over the micro-heater to record the thermal characteristics when the micro-heater was subject to different applied voltages. By using this infrared sensing technique, accurate temperature readings as well as comprehensive thermal distribution patterns were obtained. The relationship between temperature and applied voltage was determined by focusing the IR camera on the central helical range of the micro-heater. The measured results for a heater with ~75 μm wide strips are shown in FIG. 7, from which we can see that the temperature rises monotonically from room temperature with increasing applied voltage. The relationship can be well-fitted by an exponential. The maximum temperature is seen to reach about 250° C. when the applied voltage is 2.5 V. Two actual IR images of the micro-heater taken at different voltages are shown in the insets. On the left panel, the heating distribution has a rectangular shape with a broad thermal distribution, while on the right panel one can observe localized heating distribution (the bright spot that is ~400×400 $\mu m^2$ in area) where the temperature of the micro-heater was raised up to 250° C. These thermal distribution pictures show the heated area to be much larger than the size of the micro-heater, with lower temperatures extending much further beyond the heater than the higher temperatures, as necessitated by heat conduction. The relatively small area of the high temperature region means that the micro-heater can be useful for sample annealing or for a reaction carried out locally, such as those carried out, for example, on bio-chips and micro chemical reactors.

Fabrication and Characterization of Flexible Thermochromic Displays

Another example of using PDMS-based conducting composites of the inventive subject matter is for a flexible display device. Flexible display devices fabricated using PDMS-based conducting composites of the inventive subject matter may offer the further advantages of contributing to lighter weight, increased portability, and/or increased durability. [11, 12] Many flexible display devices are based on liquid crystals combined with polymeric structures. For example, displays with high flexibility can be fabricated using liquid crystal encapsulated as single pixels in elastomer substrate, [13] or in field-induced polymer structures. [14] To drive the displays, conducting wires/patterns are indispensable for transmitting the controlling signals. Recently, an ultralow-power organic circuit has been realized. [15] It was reported that the electric circuits can be fabricated with electric and photolithography, [16, 17] direct ink-jet printing with conductive compositions, [18, 19].

Some embodiments of the present subject matter provide for the design and fabrication of a thermally activated display using films made of thermochromic composite and embedded conductive wiring patterns. Thermo-chromic powder is a material whose optical properties (e.g., color) are tunable by varying the temperature, in a reversible and repeatable manner. Preparations of such material have been mainly studied with respect to the reversible thermochromic effect. [20-22] Owing to the accurate, rapid, and stable characteristics, [23] this material promises broad applications ranging from smart windows, color filters, and temperature sensors. [24, 25] Polydimethylsiloxane (PDMS) plays an important role for our thermal displays, mainly due to its desirable wetting characters with thermochromic nanoparticles and silver powders. Thus the thermochromic or conducting polymer gel can be easily made. [26]

The display of the inventive subject matter is based on the use of two materials: (a) thermochromic polymers and (b) a conductive particle+PDMS conductive composite as described throughout the specification. A variety of thermochromic polymers known to one of ordinary skill in the art may be used to fabricate the display. In one embodiment, microencapsulated thermochromic powder (for example, 3 7 μm in diameter, Lijinkeji Co. Ltd) may be employed whose color, for example, is dark green at room temperature and turns white, for example, above 60° C. When the powder is mixed with PDMS, for example, PDMS 2025 (Dow Coning 184), at a particle concentration of 20% (w/w), for example, and thoroughly ground, a liquid-like composite is formed that has a dark-green color. To prepare the conducting composite, micron-sized silver powder (1.2 2.2 μm), for example, is used and mixed with PDMS at the silver concentration of 86.3% (w/w), for example. After vigorously stirring, the composite formed a gel-like soft mixture. With soft-lithographic technique, the conducting composite offers advantages of ease in patterning microconducting wires and in integrating electrical circuits, for example. When the thermochromic composite is spun at a speed of 400 rpm for 18 seconds onto the designed patterns and cured after a short bake, a thermochromic display is formed, with the thickness of 150 μm, for example. Owing to the PDMS matrix, the thermochromic and conducting composite exhibits polymeric properties with excellent flexibility. The ease in shaping the conducting patterns offers a great advantage in the design of the display devices of the inventive subject matter.

Figure 8:
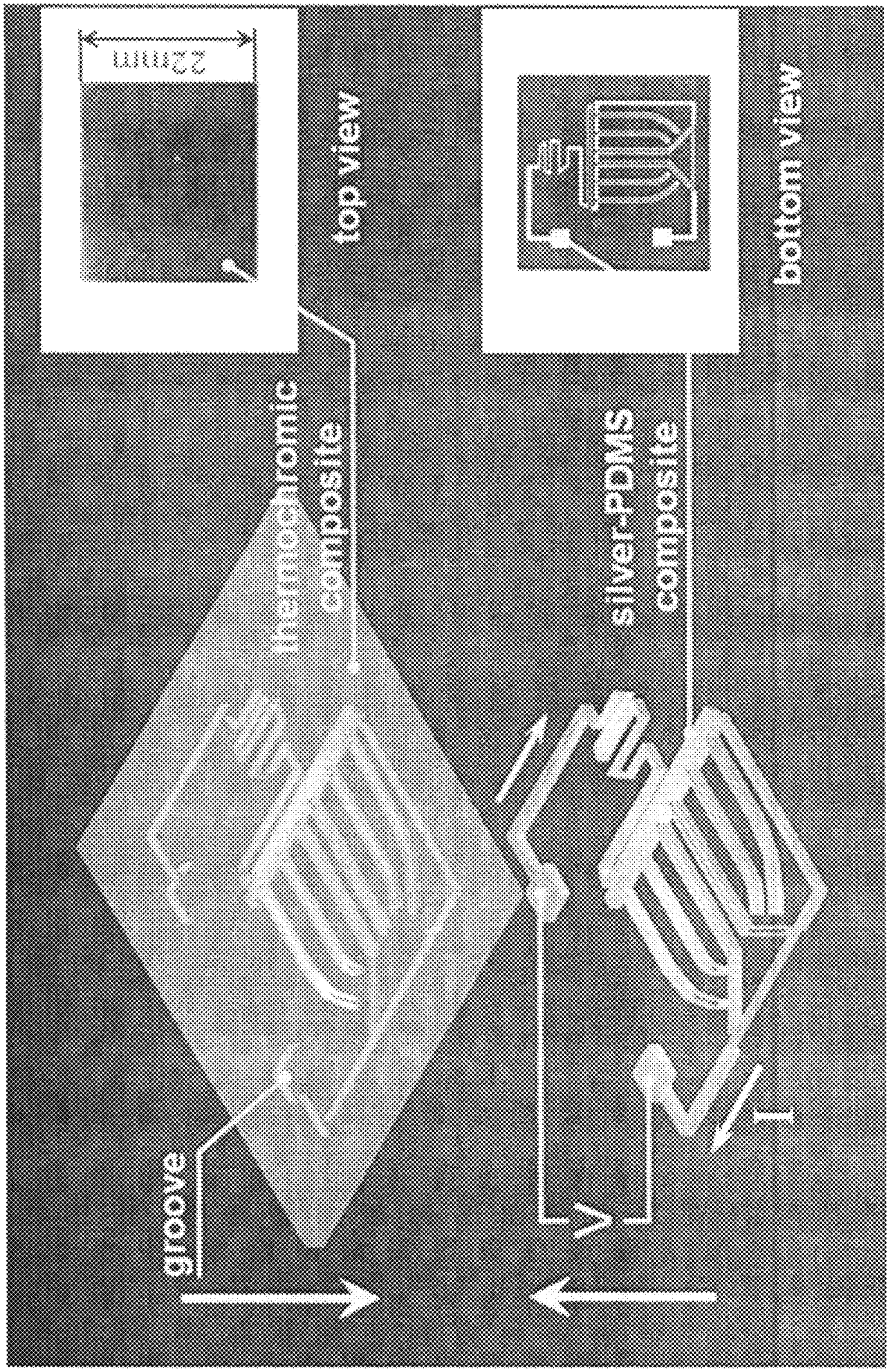
FIG. 8. Schematic illustrations of a representative display structure. The logo-patterned conductive wirings are shaped from silver microparticle PDMS composite by using soft lithography. The conductive wire pattern is embedded into the thermochromic sheet. Inserts at the right show the top and bottom views of the fabricated device.

FIG. 8 is a three-dimensional picture showing an example structure of a display cell. It is a single layer of thermochromic sheet in which the conductive wire pattern, in the shape of a logo, is embedded. When a voltage is applied to the two outstretched electrodes, the resulting electrical current will generate localized heating to the thermochromic layer that lies directly above the conducting wires. [27] Once the local temperature rises, for example, to 60° C. or above, the color of the thermochromic layer promptly turns, for example, from dark green to white, leading to a visible, white image of the logo. As the average thermal diffusivity of the thermochromic composite is very small, e.g., about $2.4\times10^{-3}$ $cm^2$ $s^{-1}$, the logo will remain sharp with well controlled localized temperatures and will not be blurred via thermal conduction. For accurate and ease of control, the conducting pattern of this example has been designed as a series circuit to ensure that the same current passes through the whole path. Local conductance of the pattern may be predesigned by altering the width of the conducting lines: lines for generating heat generally need higher resistance and therefore are designed, for example, to have a 100 μm width; others for electrical conduction are wider (for example, 300 μm) so as to lower the resistance. The upper right inset of FIG. 8 is a top view of an example display which is a 22-mm-wide square. The thermochromic material completely covers the conducting patterns and presents a uniform dark-green coloration. The conducting wires are visible in the bottom view, shown in the lower right inset.

Figure 9:
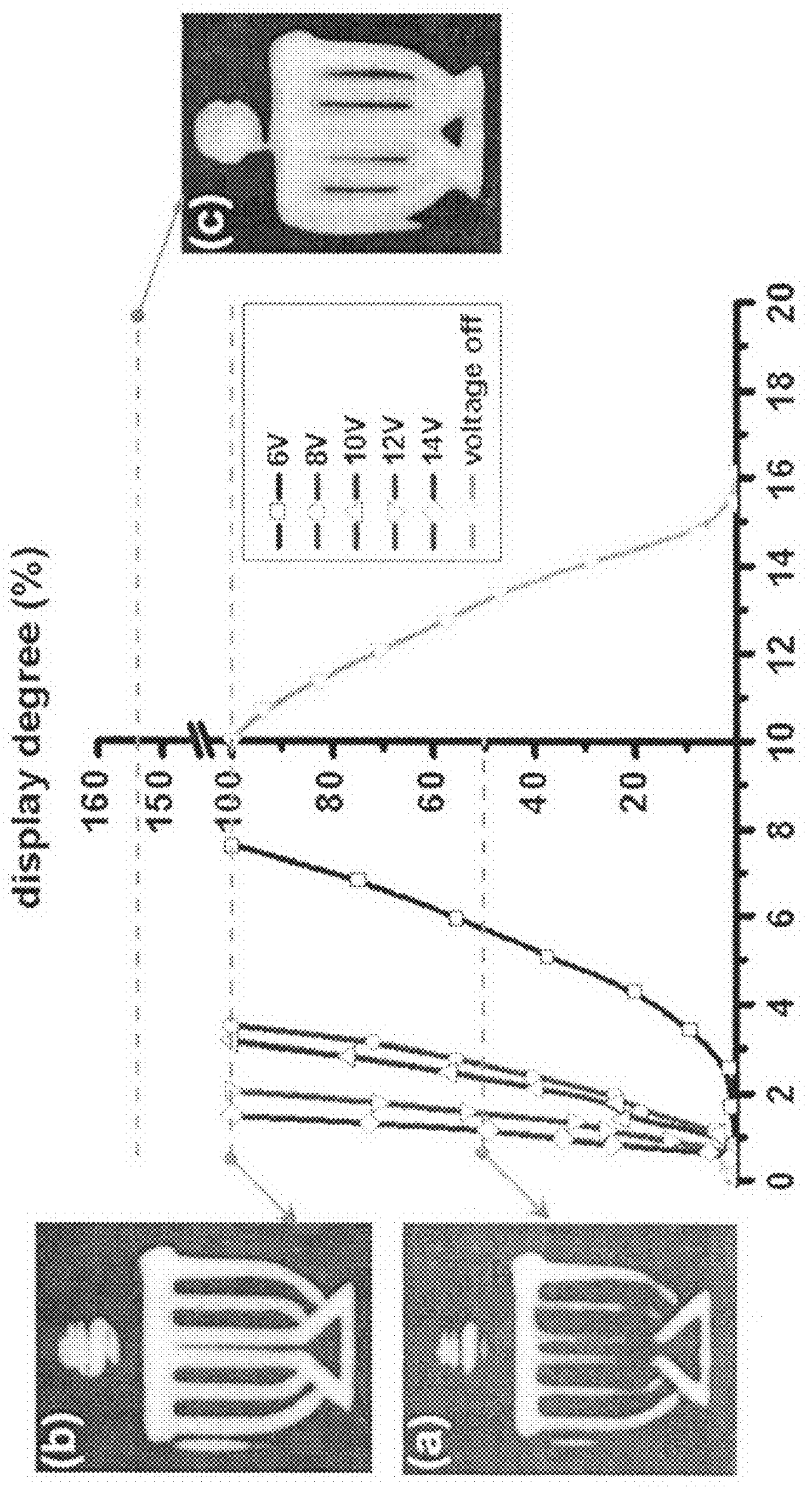
FIG. 9. Display degree plotted as a function of applied voltage. The five curves on the left correspond to a step-function voltage of various height, while the one on the right corresponds to what happens after the voltage is turned off. The insets show the logo images at various display degrees. The image in inset (c) is blurred due to overheating.

An important feature in the performance of a display is the response time to the applied voltage. An example was carried out at ambient temperature, for example, 20.4° C., on a testing sample with 80Ω resistance. A charge coupled device camera was employed to record image evolution when the thin thermochromic film is subjected to a step-function DC voltage. Images were arranged in a time sequence, and the image which resulted in the most complete and accurate logo for the example display was recorded and is shown as inset (b) in FIG. 9. This image was then defined as 100% display degree (clearest). For these experiments, the images' display degrees were determined by using a commercial software (PHOTOSHOP). The images' display degree versus time under different voltages were plotted in FIG. 9. In two cases, shown in insets (a) and (c), the corresponding images were also displayed. They were clearly inferior to that shown in inset (b). The pictures on the left side of FIG. 9 illustrate the speed at which the images appeared after the voltage was applied in the example. It is seen that as the voltage was increased from 6 to 14 V, the response time was significantly decreased. At a fixed voltage, the display degree increased with time. When the voltage was higher than 8 V, the film was capable of attaining a clear image within about 2 s. Increasing either the time duration or voltage of the applied voltage results in a display that can be overheated, leading to a blurred image, as shown in inset (c) on the right side of FIG. 9.

Figure 10:
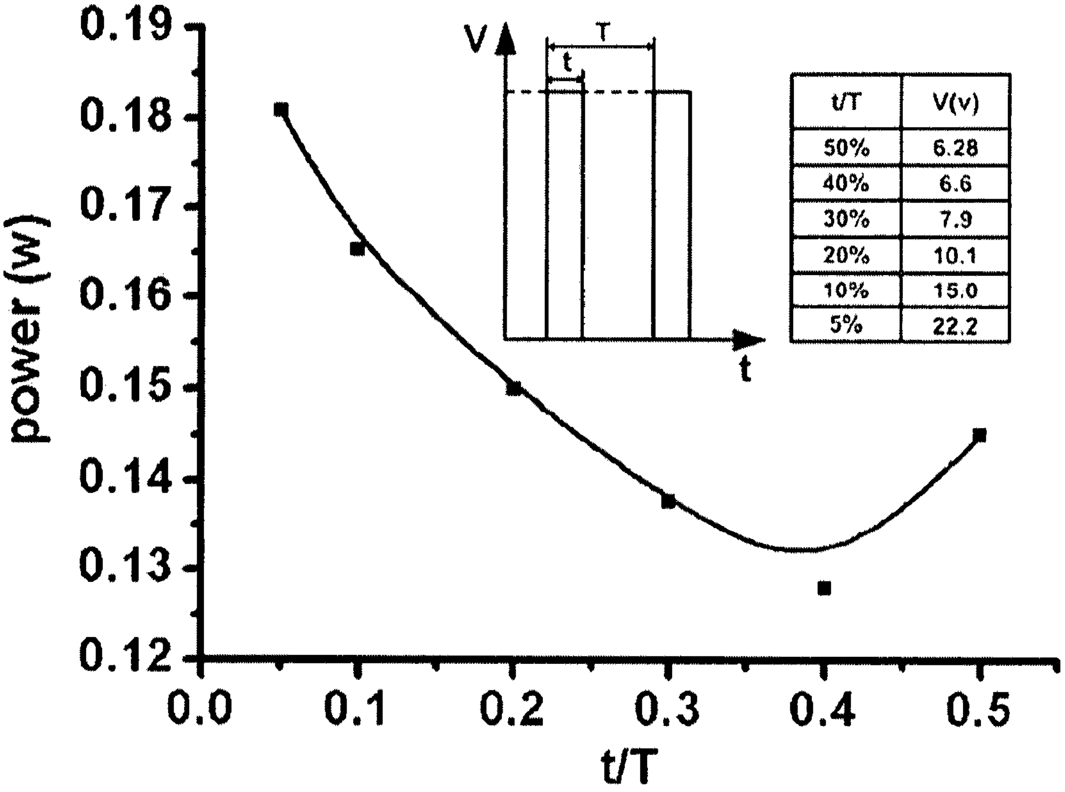
FIG. 10. Power consumption of the display under different t/T ratios of the heating pulse train. The duty cycle is fixed at 50 Hz. The table gives the best voltage values (for achieving an accurate image) associated with the various values of t/T ratio. Solid curve is calculated from the expression given in the text. Solid squares are measured data.

To overcome the problem of overheating, for example, periodic square pulse trains with a fixed duty cycle were used. This can avoid excessive heating, maintain the desired clear image, as well as decrease power consumption. To optimize the square pulse duration t and voltage V, a series of experiments were carried out with the pulse period T fixed at 20 ms. The table in FIG. 10 provides the best values of V (for best images) under different t/T ratios, ranging from 5% to 50%. It is evident that with decreasing t/T, the best V value increases monotonically. Power consumption as a function of t/T can also be calculated. For example, as the resistivity of the silver-PDMS conducting composite increases 70% from 22° C. to 60° C., [28] the resistance of the conducting pattern would be 136Ω in the display mode. Power consumption W is thus given, for example, by $W=(V^2\times(t/T))/R$, which is plotted in FIG. 10 as the solid line, where the V value used is that for the best images. The solid squares were the measured values. Good agreement was seen. These results show that the energy can be reduced to a minimum of 0.13 w at t/T~40%. When the t/T value surpasses the optimal point, the power consumption increases rapidly. Thus the minimum in the power consumption is the result of the competition between pulse duration and the applied voltage. While a decrease in t/T favors energy reduction, the coincident increase in the best V value would offset this reduction through the $V^2$ dependence. Based on the above results, in one embodiment, the application of periodic square pulse train not only solves the problem of overheating but can also lower power consumption.

Figure 11:
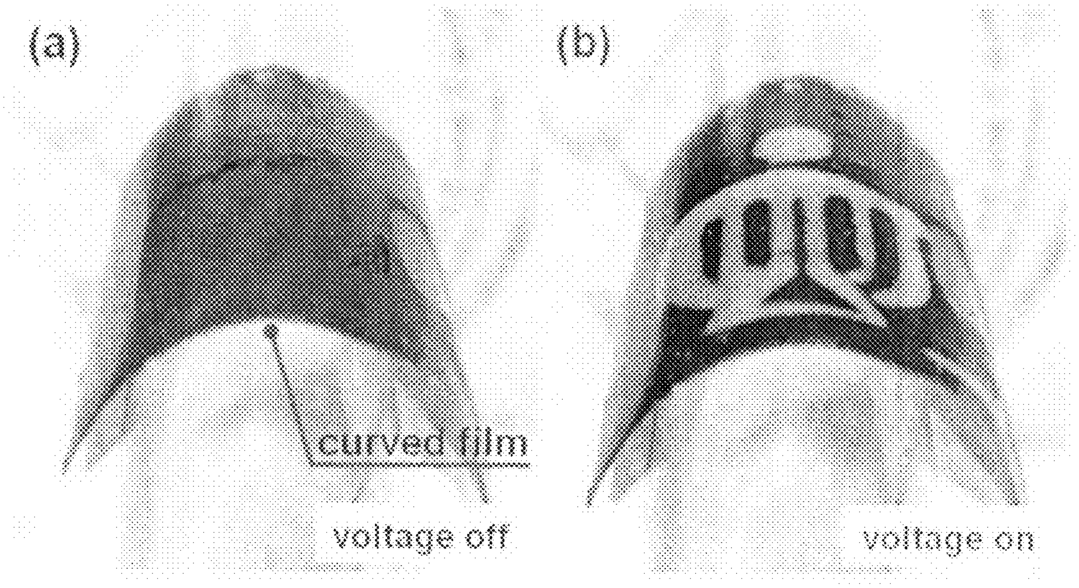
FIG. 11. Display's function is shown to be not affected by mechanical distortion. Here, the display is wrapped on a column. (a) Shows the display film when no input signal is applied, and (b) shows the logo image to be correctly displayed when a voltage heating pulse train is applied.

The mechanical property of the PDMS-based thermochromic material and conducting composite endows the thermochromic display with high flexibility. The thickness of the film, for example, ~150 μm, enables the film to bend, fold, and distorted at discretion while preserving the normal displaying functions. FIG. 11(*a*) shows an example of a display wrapped around a column. Once a voltage is applied, the logo image appears promptly, as shown in FIG. 11(*b*). With such mechanical flexibility, thin-film thermochromic displays of the inventive subject matter can easily adapt to a variety of application environments.

Based on the ease of fabrication and simple architecture, the thermochromic display can have advantages in lowering the display unit cost. The heating pulse control scheme can also provide lower power consumption, and the light weight and mechanical flexibility can provide additional portability, convenience, and durability. With matrix-like thermal pixels, for example, programmable images can be generated with digital control.

Fabrication and Characterization of Microfluidic Reaction Systems

Another example of using PDMS-based conducting composites of the inventive subject matter is for a microfluidic reaction system. Flexible display devices fabricated using PDMS-based conducting composites of the inventive subject matter may offer the further advantages of contributing to lighter weight, increased portability, and/or increased durability.

The terms "microfluidic chip" and "microfluidic reaction system" as used in the inventive subject matter are interchangeable and refer to a device that conveniently supports the separation and/or analysis of chemical and/or biological sample sizes that are as small as a few nanoliters or less. In general, these chips are formed with a number of microchannels that may be connected to a variety of reservoirs containing fluid materials. The fluid materials may be driven or displaced within these microchannels throughout the chip using electrokinetic forces, pumps and/or other driving mechanisms. These microfluidic devices may utilize Micro-Electromechanical-Systems (MEMS) elements: for example, chemical sensors; biosensors; micro-valves; micro-pumps; micro-heaters; micro-pressure transducers; micro-flow sensors; micro-electrophoresis columns for DNA, RNA, and/or protein analysis; micro-heat exchangers; micro-chem-lab-on-a-chip; etc. These microfluidic devices can conveniently provide mixing, separation, and/or analysis of fluid samples within an integrated system that is formed on a single chip. The term "bio-chip" as used in the inventive subject matter refers to a "microfluidic chip" that is primarily used for the separation and/or analysis of biological samples.

Temperature is a basic environmental parameter which can affect many material properties. Various types of temperature sensors are available, such as fiber-optic sensors for high-temperature measurements, [29] sensors of organic thin film transistors, [30] etc. Recent interest on microfluidic chips for chemical and biological functions [31] has focused attention on temperature control in these systems, as thermal detection and control are important in microreactions and bioprocesses, e.g., experiments regarding DNA sequencing and cell biology applications. [32] Platinum thin film has been commonly used as a temperature sensor in microchips. [33] It has been reported that thermal microscopic scan, using fluorescent particles as sensor, has also been employed. [34] In another approach, infrared cameras are frequently utilized to not only obtain surface temperature distributions via images [35] but also constitute a feedback system for temperature control. [36] Low cost infrared sensors have been developed for these purposes. [37]

For its ease of fabrication, biocompatibility, and other merits, polydimethylsiloxane (PDMS) is considered as a primary base material for microchip fabrications. [38] However, owing to its weak bonding characteristic with metallic materials, it is difficult to implement microtemperature sensors inside PDMS chips during the soft lithographic fabrication process. In addition, since the material would shield signals from IR cameras, contactless sensing of local temperature inside the microchips is difficult. To solve the problems mentioned above, a design and fabrication of thermochromic microcolor bars is presented in the inventive subject matter, which provides a local temperature indicator inside the microfluidic chip which can be sensed optically. Together with the embedded PDMS/silver particle-based microheater and optical sensor of the inventive subject matter [39], a further embodiment provides that the local thermal characteristics of microfluidic chips can be easily monitored and controlled through a feedback electronic system.

Figure 12:
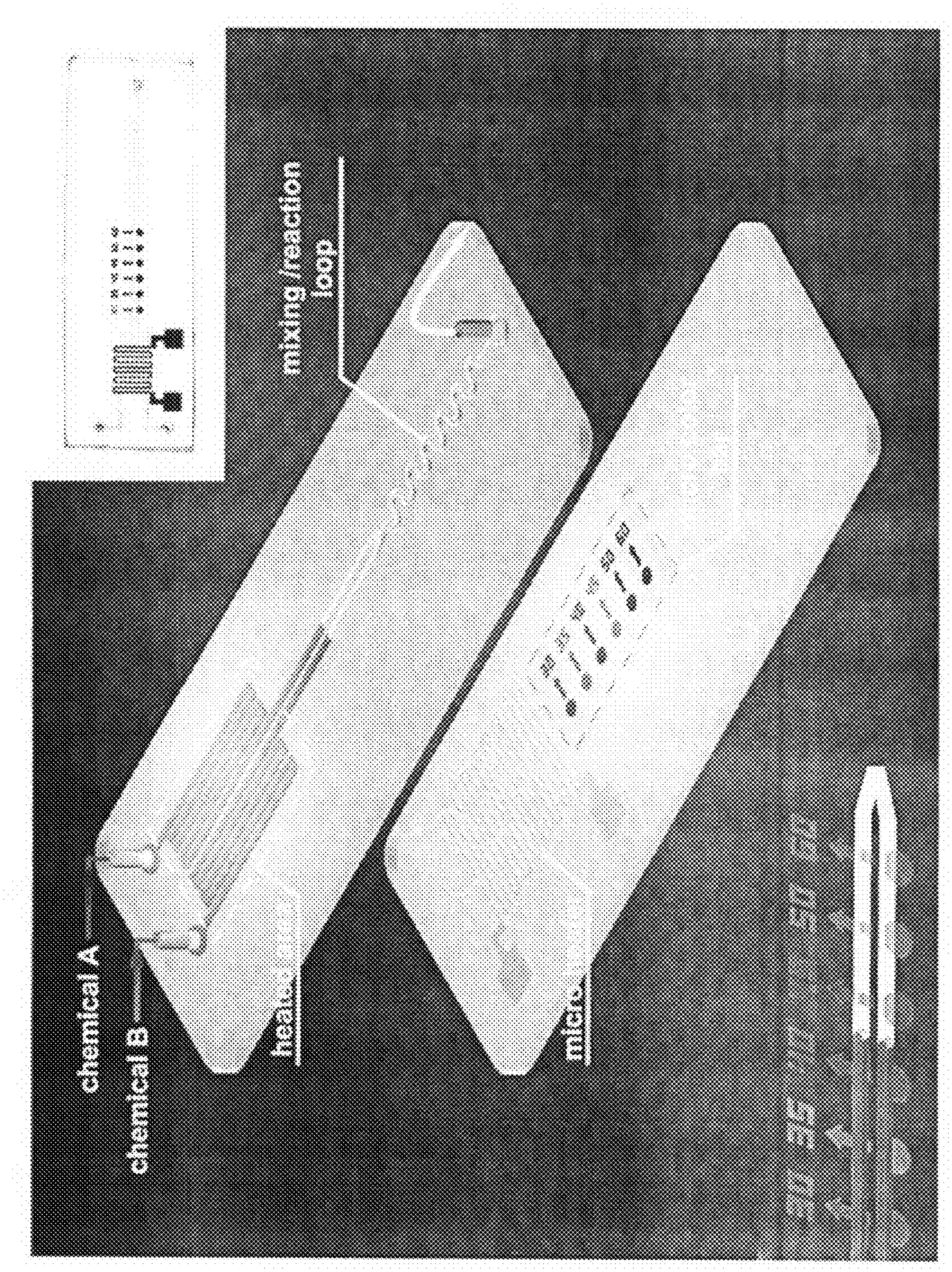
FIG. 12. Schematic illustrations of the three-dimensional layered structure of the PDMS microreaction chip. The thermochromic color bars and microheater are located on the lower layer, while the microfluidic channels for chemical reactions are on the upper layer. The lower left inset shows an enlarged view of the thermochromic color bars and the upper right inset shows an image of the fabricated device.

To show the functionality of our approach, a microfluidic chip for a well-known chemical reaction experiment, for example, as shown in FIG. 12, was designed. The upper right inset is the top view of an image of an example microfluidic chip, which is 32 mm in length and 10 mm in width. The color bars located at the lower layer consists of six different bars, for example, each fabricated with a specific mixture of thermochromic particles (for example, 3 7 μm in diameter, Lijinkeji Co., Ltd.) and pure PDMS. [39] The color transition temperature for each of the six bars is arranged in sequence and temperature ranges, for example, ranging from 30 to 60° C. For ex-ample, when the temperature exceeds a certain value, corresponding color bar(s) will transform from its original color to a different color, for example, white. Every bar may associated with a circle (for optical sensing, see below), an arrow, and a digital number indicating its color transition temperature, as shown in FIG. 12. The contrast changes of color bars are very sensitive to the temperature which may be calibrated by a hot stage which is precisely controlled by a thermocouple temperature control system. A microheater (for example, synthesized with silver-PDMS composite) with an initial predetermined resistance, for example, 69Ω, is also embedded in this layer to generate heat in the prespecified area. An example of a fabrication process for the microheater is discussed above and can also be found in our previous work. [40] Microfluidic channels, for example, 200 μm in width and 100 μm in depth, are located at the upper microchip layer. These channels may have three functional sections: a heating section, a temperature detection section, and/or reaction loops. In one embodiment, the heating section has two symmetric zigzag channels for heating the chemical solutions when two different chemicals (A in blue and B in red) are injected into the chip. When the two heated fluids flow through the temperature detection section, the solution temperature will cause the color bars (which are in contact with the microfluidic channels) to change color (lower left inset in FIG. 12), and in the process its temperature becomes apparent. After flowing through the temperature detection section, the two chemical solutions are mixed, for example, in the reaction loop, leading to a chemical reaction at the desired temperature.

Figure 13:
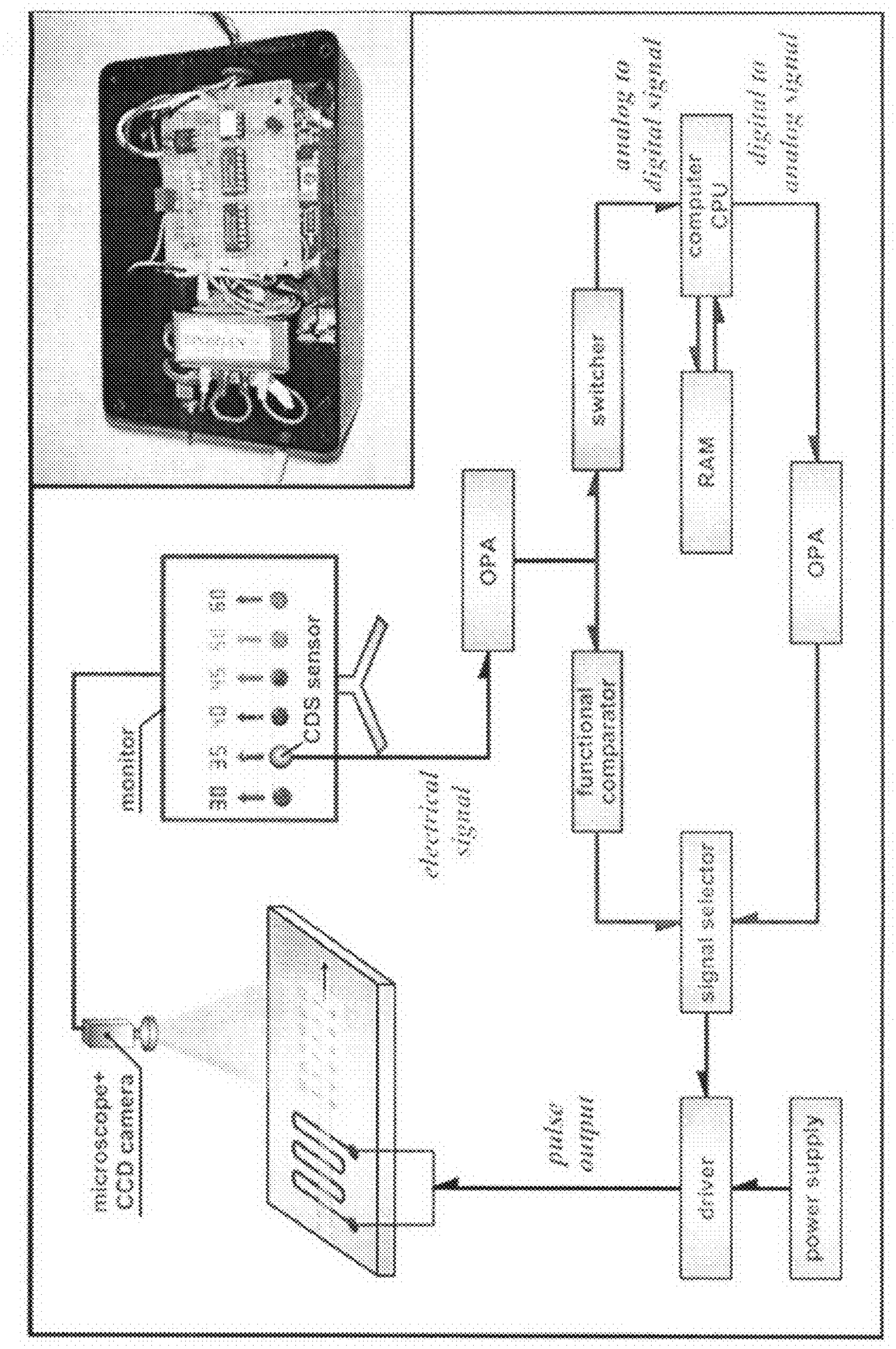
FIG. 13. Diagrams of the optical-electrical temperature sensing and control processes. Combined with computer storage of calibrated control signals, this process can achieve accurate local temperature control in microfluidic devices. The process is operated via a control box shown in the upper right panel.

In another embodiment, in order to precisely control the local temperature inside the microfluidic chip, a temperature detection and feedback control system for the microheater is designed and constructed, an example shown as a flowchart in FIG. 13. A color detector is positioned next to the chip to monitor the color bar area. In one embodiment, a microscope connected with a charge coupled device (CCD) camera is positioned upright over the chip to monitor the color bar area. When the color bars vary their contrast at different temperatures, their color images are detected and displayed by the color detector, for example, the CCD camera and displayed on a monitor. In one embodiment, a photoconductive cell sensor (for example, (CdS) (NORP12, Silonex Inc.)) would convert the detected image contrast (calibrated by a standard temperature control system mentioned above) into a digital electronic signal, input to the feedback system, as shown for example in FIG. 13. Other various photoconductive cell sensors would also be known by one of ordinary skill in the art to be useful with the feedback system described herein. Thus, for example, if the microfluidic temperature is set to be 35° C., the sensor (for example, a CdS sensor) will be deployed to focus on the circle area of the relevant color bar, denoting the sensor induction zone. For example, CdS sensor is sensitive to image contrast; e.g., when the induction zone is bright, CdS conductivity will have a high value; when the zone is dim, the conductivity will be reduced. Hence, the sensor will detect color brightness from the induction zone in order to determine the on/off status of the micro-heater. This is achieved through an operational amplifier which amplifies the signal from the sensor and passes it to a functional comparator (for example, route in red color, FIG. 13). The functional comparator will determine the output status of the power supply. If a signal representing dim color in the induction zone is received (temperature is lower than that of the set temperature), the comparator will generate a trigger signal to turn on the microheater power supply so as to increase the temperature. When the temperature of the induction zone reaches the set temperature value, the corresponding color bar would change to white, for example, and the comparator will cut off the voltage output from the driver. In this manner, the feedback system adjusts the microfluid temperature.

In case the desired set temperature should be maintained for a long period of time, the analog control signal can be converted to digital form and stored in random access memory. The signal selector is then disconnected from the feedback loop and instead receive the control signal from the CPU after a reverse digital to analog conversion. In this way, the optical-electronic feedback control loop would serve only for the initial calibration purpose, with the subsequent temperature control independent from the microscope and the CCD camera.

Figure 14:
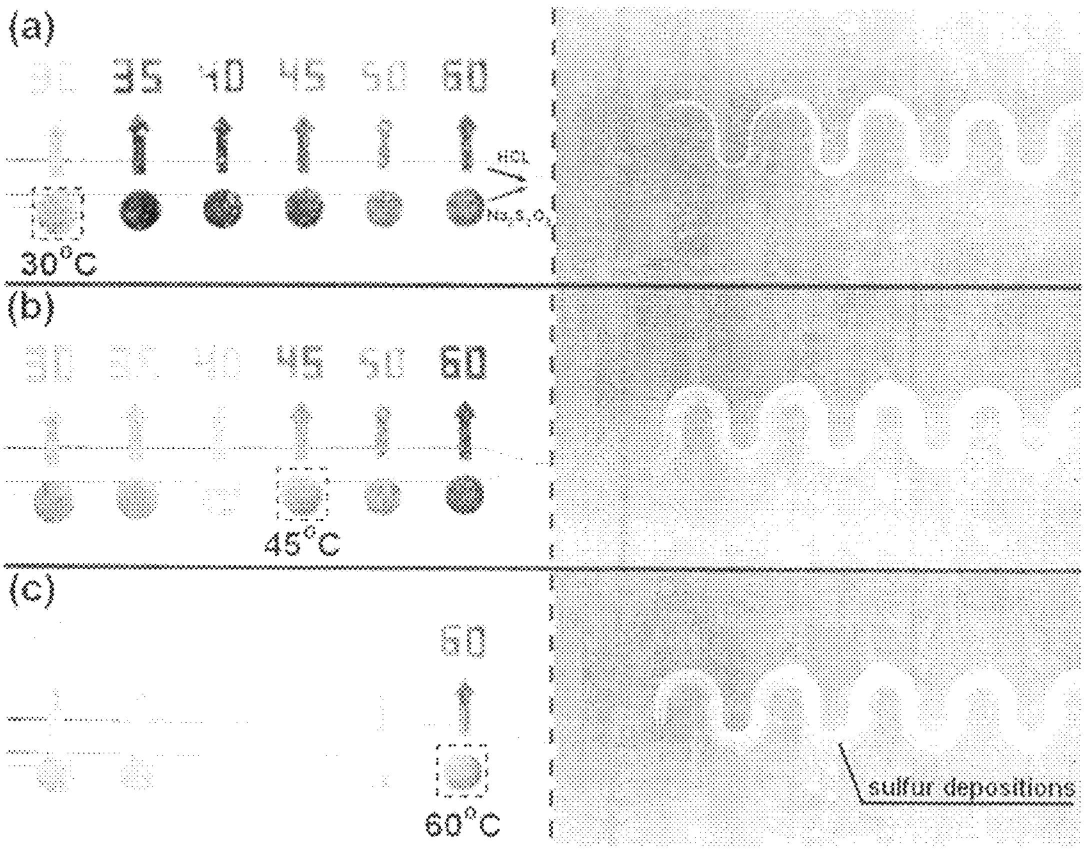
FIG. 14. A demonstration of temperature controls in a microreaction involving sodium thiosulfate and hydrochloric acid. Left panels show the set target temperatures on the thermochromic color bars. Corresponding reactions are shown to the right. Here, the reaction product, sulfur, is what makes the loops clearly visible.

A chemical reaction experiment was carried out to test the functionality of the thermochromic color bar and the associated temperature control aspects the system. Liquid solutions of sodium thiosulfate and hydrochloric acid in concentrations of 3 and 6 mol/L, respectively, were injected into the microchannels at the velocity of 0.02 ml/m with a syringe pump. When the two chemical solutions were mixed, reaction occurred and sulfur (yellow in color) became visible. Hence, on the right panels of FIG. 14, the invisible sections of the reaction loop indicate not-yet-reacted chemical solutions, whereas the clearly visible sections indicate the presence of sulfur. The intensity of the reaction was observed to increase with the reagents' temperature, with more sulfur becoming visible in the loop channel. When the CdS sensor was set on the 30° C. color bar, the reaction was barely proceeding and sulfur particles were formed only in the last two loops, as shown in the right panel of FIG. 14(*a*). However, when the temperature was set at 45° C., the reaction accelerated, with sulfur becoming visible after the first loop. A similar situation was observed when the temperature was set at 60° C., whereby the reaction proceeded very quickly and large particles of sulfur were visible almost right after mixing. Images on the left panels show that as long as the appointed color bar reached the set temperature, even a very slight contrast change can be immediately detected by the sensor and a corresponding output signal to the control system was generated to accurately maintain the heater's status. The different reaction results validated our control system's capability in adjusting the temperature in microreactions within the desired range.

Figure 15:
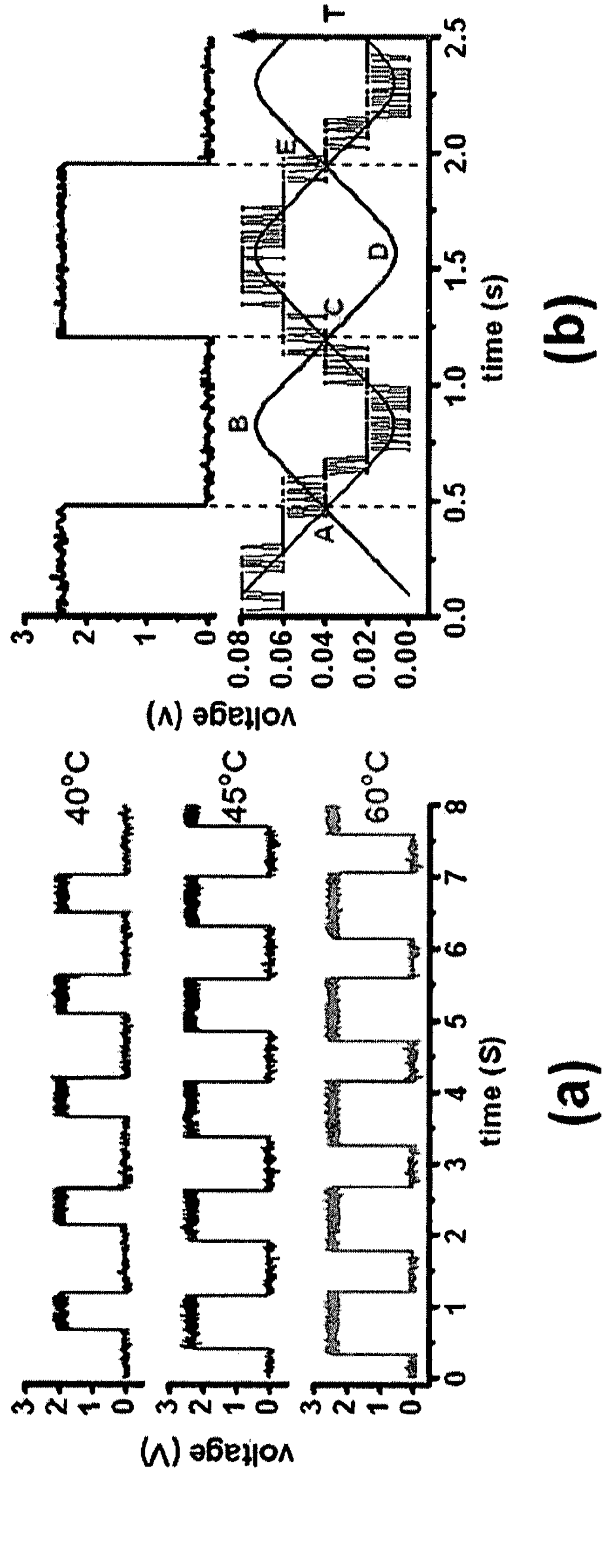
FIG. 15. (a) Square-wave trigger pulse signals generated by the system to control the microheater. (b) CdS output voltage (fitted by the blue line on the lower panel) is juxtaposed with the predicted temperature variation (red line). The corresponding trigger voltage pulse train is shown on the upper panel. There is a systematic delay time of ~0.7 s.

In order to quantitatively validate the temperature control, an oscilloscope was used to record synchronous signals to the microheater and the voltage output from the CdS sensor. FIG. 15(*a*) shows trains of square waves for driving the microheater at the set temperatures of 40, 45, and 60° C. It can be seen that at fixed pulse amplitude, a higher set temperature of the microheater requires longer pulse duration, with slightly increased duty cycle as well. In FIG. 15(*b*), the CdS voltage output for 45° C. set temperature (lower panel), fitted by a dark blue line, is compared with the corresponding triggered pulse (upper panel). As the temperature of the color bar rises and the contrast becomes lighter, the resistance of the sensor decreases, thus bringing down the voltage output. Hence, by reversing the voltage output of the CdS sensor in the blue line, the temperature variation tendency is obtained, indicated by the red line. It can be seen that once the desired temperature of 45° C. at point A is reached, the trigger pulse (upper panel) is turned off, but the temperature is seen to keep rising to peak B before decreasing to 45° C. again at point C. When the trigger pulse to the heater is turned on at the next pulse, there is a delay for the heater to heat up the fluid; hence, the temperature decreases to point D before rising up again to point E. It can be seen that voltage from the CdS sensor is in very small values and the response time is measured to be ~0.7 s. Hence, stable temperature can be maintained with only small fluctuations owing to the response time of the system.

Having described the invention in detail and by reference to the embodiments thereof, it will be apparent that modifications and variations are possible, including the addition of elements or the rearrangement or combination or one or more elements, without departing from the scope of the invention which is defined in the appended claims. Thus, the present invention is not intended to be limited to the embodiments shown herein but is to be accorded the widest scope consistent with the principles and novel features disclosed herein.

REFERENCES

U.S. Patents

U.S. Pat. No. 7,125,510 Huang Zhili, Microstructure fabrication and microsystem integration, Oct. 24, 2006.

U.S. Pat. No. 6,692,680 Lee; Jeong-Bong et al., Reproduction of micromold inserts, Feb. 17, 2004

U.S. Pat. No. 6,679,471 Domeier; Linda A. et al., Castable plastic mold with electroplatable base, Jan. 20, 2004.

U.S. Pat. No. 6,323,659 Krahn; John Raymond, Material for improved sensitivity of stray field electrodes, Nov. 27, 2001.

Papers

[1] C. C. Lee, et al. *Science,* 310, 1793 (2005).

[2] M. A. Unger, H. P. Chou, T. Thorsen, A. Scherer and S. R. Quake, *Science* 288, 113 (2000).

[3] K. A. Shaikh, et al. P. *Natl. Acad. Sci. USA.,* 102, 9745 (2005).

[4] Y. N. Xia and G. M. Whitesides, *Annu. Rev. Materi. Sci.,* 28 153, (1998)

[5] J. C. McDonald, G. M. Whitesides, *Accounts Chem. Res.,* 35 (7) 491 (2002).

[6] T. Vilkner, D. Janasek, and A. Manz, *Anal. Chem.,* 76, 3373 (2004).

[7] A. A. Darhuber, J. P. Valentino, J. M. Davis, S. M. Troian, and S. Wagner, *Appl. Phys. Lett.,* 82, 657 (2003).

[8] A. J. Gawron, R. S. Martin and S. M. Lunte, *Electrophoresis,* 22, 242 (2001).

[9] K. J. Lee, K. A. Tosser, R. G. Nuzzo, *Adv. Funct. Mater.,* 15(4), 557 (2005).

[10] K. S. Lim, W. J. Chang, Y. M. Koo and R. Bashir, *Lab on a Chip,* 6, 578 (2006).

[11] R. A. Street, W. S. Wong, S. E. Ready, M. L. Chabinyc, A. C. Arias, S. Limb, A. Salleo, and R. Lujan, Mater. Today 9, 32 (2006).

[12] L. Zhou, A. Wanga, S. C. Wu, J. Sun, S. Park, and T. N. Jackson, Appl. Phys. Lett. 88, 083502 (2006).

[13] Y. T. Kim, J. H. Hong, T. Y. Yoon, and S. D. Lee, Appl. Phys. Lett. 88, 263501 (2006).

[14] E. A. Büyüktanir, N. Gheorghiu, J. L. West, M. Mitrokhin, B. Holter, and A. Glushchenko, Appl. Phys. Lett. 89, 031101 (2006).

[15] C. Balocco, L. A. Majewski, and A. M. Song, Org. Electron. 7, 500 (2006).

[16] H. Klauk, U. Zschieschang, J. Pflaum, and M. Halik, Nature (London) 445, 745 (2007).

[17] W. Shen, Y. Chen, and Q. Pei, Appl. Phys. Lett. 87, 124106 (2005).

[18] D. Kim, S. Jeong, B. K. Park, and J. Moon, Appl. Phys. Lett. 89, 264101 (2006).

[19] J. M. Leger, A. L. Holt, and S. A. Carter, Appl. Phys. Lett. 88, 111901 (2006).

[20] Y. Noguchi, T. Sekitani, and T. Someya, Appl. Phys. Lett. 89, 253507 (2006).

[21] M. Seredyuk, A. B. Gaspar, V. Ksenofontov, S. Reiman, Y. Galyametdinov, W. Haase, E. Rentschler, and P. Gutlich, Chem. Mater. 18, 2513(2006).
[22] A. Seeboth, J. Kriwanek, and R. Vetter, Adv. Mater. (Weinheim, Ger.) 12, 1424 (2000).
[23] C. R. Smith, D. R. Sabatino, and T. J. Praisner, Exp. Fluids 30 130 (2001).
[24] A. Mills, and A. Lepre, Analyst (Cambridge, U. K.) 124, 685 (1999).
[25] M. G. Baron and M. Elie, Sens. Actuators B 90 271 (2003).
[26] Y. N. Xia and G. M. Whitesides, Annu. Rev. Mater. Sci. 28, 153 (1998).
[27] L. Liu, S. Peng, X. Niu, and W. Wen, Appi. Phys. Lett. 89, 223521 (2006).
[28] X. Niu, S. Peng, L. Liu, W. Wen, and P. Sheng, Adv. Mater. (Weinheim, Ger.) (in press).
[29] E. Li, X. Wang, and C. Zhang, Appl. Phys. Lett. 89, 091119 (2006).
[30] S. Jung, T. Ji, and V. K. Varadan, Appi. Phys. Lett. 90, 062105 (2007).
[31] A. J. deMello, Nature (London) 442, 394 (2006).
[32] M. S. Jaeger, T. Mueller, and T. Schnelle, J. Phys. D 40, 95 (2007).
[33] W. H. Song and J. Lichtenberg, J. Micromech. Microeng. 15, 1425 (2005).
[34] L. Aigouy, G. Tessier, M. Mortier, and B. Charlot, Appl. Phys. Lett. 87, 184105 (2005).
[35] A. W. Jackson and A. C. Gossard, J. Cryst. Growth 301, 105 (2007).
[36] M. G. Roper, C. J. Easley, L. A. Legendre, J. A. C. Humphrey, and J. P. Landers, Anal. Chem. 79, 1294 (2007).
[37] F. Tsow and N. Tao, Appi. Phys. Lett. 90, 174102 (2007).
[38] K. H. Jeong, J. Kim, and L. P. Lee, Science 312, 557 (2006).
[39] L. Liu, S. Peng, W. Wen, and P. Sheng, Appl. Phys. Lett. 90, 213508 (2007).
[40] L. Liu, S. Peng, and W. Wen, Appi. Phys. Lett. 89, 223521 (2006).

The invention claimed is:

1. A fabricated structure comprising:

at least one PDMS-based conducting composite; and a thermochromic composite layer contacting the PDMS-based conducting composite, wherein the structure provides electrical conductivity and is mechanically elastic and flexible, wherein the at least one PDMS-based conducting composite comprises at least one material selected from the group consisting of: Ag+PDMS; and carbon black (C)+PDMS, the PDMS-based conducting composite comprising a mixture of conducting nano-to-micro particles selected from the group consisting of Ag particles from about 1.0 μm to 2.2 μm and carbon black particles ranging in average size from about 30 nm to 100 nm, mixed with PDMS gel.

2. The fabricated structure according to claim 1, wherein the at least one PDMS-based conducting composite comprises Ag+PDMS at a Ag wt/PDMS wt concentration ranging from about 83% Ag to about 90% Ag by weight.

3. The fabricated structure according to claim 2, wherein the at least one PDMS-based conducting composite comprises Ag+PDMS at a Ag wt/PDMS wt concentration ranging from about 84% Ag to about 87% Ag by weight.

4. The fabricated structure according to claim 1, wherein the at least one PDMS-based conducting composite comprises C+PDMS at a carbon black (C) wt/PDMS wt concentration ranges from about 10% C to about 30% C by weight.

5. The fabricated structure according to claim 1, wherein the at least one PDMS-based conducting composite comprises C+PDMS at a carbon black (C) wt/PDMS wt concentration ranges from about 15% C to 27% C by weight.

6. The fabricated structure according to claim 1, wherein the at least one PDMS-based conducting composite comprises Ag+PDMS with Ag particles in the form of platelets ranging in average size from about 1.0 μm to 2.2 μm.

7. The fabricated structure according to claim 1, wherein the at least one PDMS-based conducting composite comprises C+PDMS with carbon black particles ranging in average size from about 30 nm to 100 nm.

8. The fabricated structure according to claim 1, wherein the fabricated structure is one selected from the group consisting of a rod array, a multilayer wiring co-junction, and a cross bridge, comprising the electrical conductivity and is mechanically elastic and flexible.

9. The fabricated structure according to claim 1, wherein the fabricated structure comprises at least one conducting wiring structure having a minimum size of 10 microns.

10. The fabricated structure according to claim 1, wherein the fabricated structure is fall-proof.

11. A micro-heater comprising the fabricated structure according to claim 1.

12. The micro-heater according to claim 11, comprising a heater strip that is at least 25 microns wide or long.

13. The micro-heater according to claim 12, wherein the maximum local temperature generated by the heater strip ranges from ambient temperature to 250° C.

14. The micro-heater according to claim 11, wherein the overall structure has at least one property selected from the group consisting of: mechanically elastic and flexible while maintaining local heating functionalities; and fall-proof.

15. A thermal array comprising the micro-heater according to claim 11.

16. A thermal array comprising:

a micro-heater, the micro-heater comprising a fabricated structure comprising at least one PDMS-based conducting composite, wherein the structure provides electrical conductivity and is mechanically elastic and flexible, and wherein the at least one PDMS-based conducting composite comprises at least one selected from the group consisting of: Ag+PDMS; and carbon black (C)+PDMS, further comprising a temperature sensing mechanism linked to a feedback control to control conductivity in a heater strip.

17. The thermal array according to claim 16, wherein the temperature sensing mechanism comprises a thermochromic color bar whose color is optically sensible.

18. The thermal array according to claim 17, wherein the temperature sensing mechanism further comprises at least one thermochromic microcolor bar whose color is optically sensible, and wherein detection of color from the at least one thermochromic microcolor bar is monitored optically and subsequent conductivity through the heating strip is controlled by an electro-optic feedback system that stops heating when desired one of the at least one thermochromic microcolor bar is activated by a desired threshold temperature.

19. A thermally activated display comprising the fabricated structure comprising at least one PDMS-based conducting composite, wherein the structure provides electrical conductivity and is mechanically elastic and flexible;

wherein the at least one PDMS-based conducting composite comprises at least one selected from the group consisting of: Ag+PDMS; and carbon black (C)+PDMS;

and wherein the fabricated structure comprises a thermochromic composite layer contacting a Ag+PDMS composite layer.

20. The thermally activated display according to claim 19, wherein the fabricated structure comprises a thermochromic composite and a Ag+PDMS composite; and wherein the fabricated structure is thermochromic, electrical conducting, and flexible.

21. The thermally activated display according to claim 20, wherein the fabricated Ag+PDMS structure is embedded with a conductive wire pattern corresponding to a predesigned pattern for display.

22. The thermally activated display according to claim 19, wherein the fabricated structure is embedded with a plurality of independent conductive wire patterns localized in a matrix-like array of individual pixels; wherein each pixel is configured to independently display a first color that is the same or different from a second color displayed by a neighboring pixel based upon a degree of heating supplied by a conductive wiring in the plurality of independent conductive wire patterns to each individual pixel.

23. The thermally activated display according to claim 21, wherein the fabricated structure comprises a thermochromic composite layer contacting a Ag+PDMS composite layer; wherein the conductive wire patterns are embedded in the Ag+PDMS layer.

24. A thermally activated display comprising a fabricated structure comprising at least one PDMS-based conducting composite, further comprising Ag+PDMS at a Ag wt/PDMS wt concentration ranging from about 84% Ag to about 88% Ag by weight, and microencapsulated thermochromic powder as a thermochromic composite, wherein the structure provides electrical conductivity and is mechanically elastic and flexible, and wherein the at least one PDMS-based conducting composite comprises at least one selected from the group consisting of: Ag+PDMS; and carbon black (C)+PDMS.

25. A method for patterning PDMS conducting composites by embedding at least one layer of a conductive composite into a PDMS elastomer, the method comprising:

synthesizing the conductive composite by mixing PDMS gel with conducting nano-to-micro particles selected from the group consisting of Ag particles in the form of platelets and carbon black particles, mixed with PDMS gel;

applying a layer of photoresist by patterning the photoresist on a glass substrate using photolithography, thereby forming a mold to pattern the conductive composite;

treating the mold with a demolding reagent;

applying the PDMS gel with the particles to the mold;

spinning the PDMS gel with the particles to ensure uniformity of the layer curing the PDMS gel with the particles by baking, to render a substantially solid composite of PDMS-based conducting composite; and removing the photoresist, thereby leaving the PDMS-based conducting composite.

26. The method of claim 25, further comprising forming an upper layer comprising microfluidic channels, the microfluidic channels comprising at least one of a heating section, a temperature detection section, and a reaction loop, and comprising at least two symmetric channels for heating chemical solutions when two different samples.

* * * * *